United States Patent [19]
Takahashi et al.

[11] Patent Number: 5,293,634
[45] Date of Patent: Mar. 8, 1994

[54] SYSTEM FOR RETRIEVING TOKEN HAVING A SELECTED NEST LEVEL AND SATISFYING PREDETERMINED RETRIEVAL CONDITION

[75] Inventors: Kousuke Takahashi; Tetsuya Yamazaki; Ryuichi Takahashi, all of Tokyo, Japan

[73] Assignee: NEC Corporation, Tokyo, Japan

[21] Appl. No.: 634,739

[22] Filed: Dec. 27, 1990

[30] Foreign Application Priority Data

Dec. 27, 1989 [JP]  Japan ................................ 1-340102

[51] Int. Cl.$^5$ ................................................ G06F 13/3
[52] U.S. Cl. ..................................... 395/800; 395/200; 364/940.8; 364/241.8; 364/DIG. 1
[58] Field of Search ............... 395/375, 800, 325, 200, 395/250; 364/DIG. 1, DIG. 2

[56] References Cited

U.S. PATENT DOCUMENTS

| | | | |
|---|---|---|---|
| 4,651,278 | 5/1987 | Herzog et al. | 364/300 |
| 4,750,114 | 6/1988 | Hirtle | 364/200 |
| 4,888,553 | 12/1989 | Codrington | 324/312 |
| 4,916,660 | 4/1990 | Takahashi | 364/900 |
| 4,926,375 | 5/1990 | Mercer et al. | 364/900 |
| 4,964,076 | 10/1990 | Schurk | 364/900 |

*Primary Examiner*—Thomas C. Lee
*Assistant Examiner*—Paul R. Lintz
*Attorney, Agent, or Firm*—Foley & Lardner

[57] ABSTRACT

In a token train retrieval device including a memory device (24) for memorizing a plurality of tokens as stored tokens each of which starts at a starting address and ends at an end address and each of which has a nest level selected from first through N-th nest levels and comprises a header and a data set where the header comprises a data length code and a data identifier code including a nest bit, a retrieval condition memory (25) memorizes a retrieval condition as a stored condition. Supplied with the header, a header register (26) holds the data length code, the data identifier code, and the nest bit as a held data length code, a held data identifier code, and a held nest bit. Responsive to the held data identifier code and a decided nest level, a checking circuit (27) checks whether or not the stored condition is satisfied to produce a matching signal when the stored condition is satisfied. An intra-train address generating circuit (29) generates an intra-train address variable in response to the matching signal, the held nest bit, and the held data length code. By using the intra-train address and the held data length code, an end address calculating circuit (30) calculates the end address of each token as a calculated address. By using the calculated address, the intra-train addresses, and the held nest bit, a nest level decision circuit (31) decides the decided nest level indicative of one of the first through the N-th nest levels.

21 Claims, 16 Drawing Sheets

SYSTEM FOR RETRIEVING TOKEN HAVING A SELECTED NEST LEVEL AND SATISFYING PREDETERMINED RETRIEVAL CONDITION

BACKGROUND OF THE INVENTION

This invention relates to a token train retrieval device for retrieving tokens including multi-media information which is communicated between heterogeneous data processing systems.

The token train retrieval device is for use in processing of protocol conversion between the heterogeneous data processing systems, processing of protocol analysis therebetween, hypertext search, retrieval of a multimedia data base, or the like. The token train retrieval device is necessary to communication and retrieval of the multi-media information between the heterogeneous data processing systems which are connected to one another in an information communication network. The information communication network is built on the basis of a network architecture systematized according to a protocol.

Inasmuch as such a protocol has been originally developed by each of computer makers, it is impossible to carry out information interchange between the heterogeneous data processing systems. In order to solve this problem, a standard protocol has been established by the International Organization for Standardization (ISO). This standard protocol is called a layer protocol of Open System Interconnection (OSI) in the art. Such a layer protocol is disclosed in a book written by William Stallings and published 1985 by Macmillan Publishing Company, New York, under the title of "DATA AND COMPUTER COMMUNICATIONS", pages 394 to 408, Chapter 12.

The layer protocol consists of seven layers which comprises a physical layer, a data link layer, a network layer, a transport layer, a session layer, a presentation layer, and an application layer. Each layer of the layer protocol has a processing function which should be standardized between the computer makers. Inasmuch as the layer protocol of the OSI is well-defined, it is possible to carry out protocol conversion between the layer protocol and a specific protocol developed by a particular computer maker. Each of the heterogeneous data processing systems comprises a protocol conversion system which carries out the protocol conversion. By the protocol conversion, it is possible to carry out the information interchange between the heterogeneous data processing systems.

Attention will be directed to the application layer. As is known in the art, the application layer is divisible into first through N-th sublayers where N represents a predetermined natural number which is equal to, for example, sixty-four. The first through the N-th sublayers are referred to as first through N-th nest levels, respectively, in the art. The first through the N-th nest levels are a lowest through a highest nest level, respectively. According to the application layer, data transmission is carried out between the heterogeneous data processing systems on the basis of Message Handling Systems (MHS) recommended by the International Telegraph and Telephone Consultive Committee (CCITT) Recommendation X.409.

More specifically, the multi-media information is transmitted between the heterogeneous data processing systems as a plurality of tokens. Each of the tokens is given by a nest level selected from the first through the N-th nest levels as a selected level. Each of the tokens comprises a header and a data set as described in Chapter 12 of the above-mentioned book. The data set has a data length and is for nesting one of the tokens that has a higher nest level than the selected level and will be referred to as a particular token. The header comprises a data length code representative of the data length and a data identifier code. The data identifier code includes a nest bit indicative of whether or not the particular token is nested in the data set.

In a conventional token train retrieval device, the tokens are memorized in a memory device as stored tokens. Each of the stored tokens starts at a starting address and ends at an end address. In prior art, retrieval of a specific token selected from the stored tokens is carried out after the stored tokens are successively read from the memory device as read tokens and the header of each of the read tokens is decoded. The specific, token has a designated nest level and the header includes a designated identifier code. Both of the designated nest level and the designated identifier code are given as a retrieval condition. More specifically, a nest level of each read token is decided by decoding the header of each read token as the selected level. Subsequently, a check is made between the selected level and the designated nest level. After decision of the selected level, the retrieval of the specific token is performed by software in a computer. The conventional token train retrieval device has been therefore disadvantageous in that a long processing time is consumed to locate the specific token which satisfies the retrieval condition. As a result, it is impossible to rapidly and smoothly carry out selection of the specific token and processing of the protocol conversion.

SUMMARY OF THE INVENTION

It is an object of this invention to provide a token train retrieval device which is capable of retrieving tokens at a high speed.

It is another object of this invention to provide a token train retrieval device of the type described, which is capable, of checking, simultaneously with a decision concerning a nest level, whether or not a retrieval condition is satisfied.

It is still another object of this invention to provide a token train retrieval device of the type described, which is operable at a retrieval processing speed higher than a readout speed at which stored tokens are successively read from a memory device.

Other objects of this invention will become clear as the description proceeds.

On describing the gist of an aspect of this invention, it is possible to understand that a token train retrieval device includes a memory device for memorizing, as stored tokens, a plurality of tokens each of which starts at a starting address and ends at an end address. Each of the tokens has a nest level selected from first through N-th nest levels as a selected level, where N represents a predetermined natural number. The first through the N-th nest levels are a lowest through a highest nest level, respectively. Each of the tokens comprises a header and a data set. The data set has a data length and is for nesting a particular one of the tokens that has a higher nest level than the selected level. The header comprises a data length code representative of the data length and a data identifier code which includes a nest bit indicative of whether or not the particular token is nested in the data set. The token train retrieval device is for retrieving the stored tokens to locate required data in the stored tokens that satisfy a retrieval condition.

According to an aspect of this invention, the above-understood token train retrieval device comprises condition memorizing means for preliminarily memorizing the retrieval condition as a stored condition. Supplied as a supplied header with the header of each of selected tokens selected from the stored tokens, a header register holds the data length code, the data identifier code, and the nest bit of the supplied header as a held data length code, a held data identifier code, and a held nest bit, respectively. Connected to the condition memorizing means and the header register and supplied with a decided nest level code, checking means checks, in response to the held data identifier code and the decided nest level code, whether or not the stored condition is satisfied. The checking means produces a matching signal indicative of a binary one when the stored condition is satisfied. Connected to the header register, the checking means, and the memory device, intra-train address generating means generates an intra-train address variable in response to the matching signal, the held nest bit, and the held data length code to select the selected tokens from the stored tokens. The selected tokens include the required data. Connected to the intra-train address generating means and the header register, end address calculating means calculates the end address of each of the selected tokens as a calculated address by using the intra-train address and the held data length code. Connected to the header register, the intra-train address generating means, the end address calculating means, and the checking means, decision means decides a decided nest level by using the calculated address, the intra-train address, and the held nest bit. The decided nest level indicates one of the first through the N-th nest levels that is selected as the selected level. The decision means supplies the decided nest level code representative of the decided nest level to the checking means.

According to another aspect of this invention, the above-understood token train retrieval device comprises condition memorizing means for preliminarily memorizing the retrieval condition as a stored condition. Supplied as a supplied header with the header of each of selected tokens selected from the stored tokens, a header register holds the data length code, the data identifier code, and the nest bit of the supplied header as a held data length code, a held data identifier code, and a held nest bit, respectively. Connected to the condition memorizing means and the header register and supplied with a decided nest level code, checking means checks, in response to the held data identifier code and the decided nest level code, whether or not the stored condition is satisfied. The checking means produces a matching signal indicative of a binary one when the stored condition is satisfied. Connected to the header register, the checking means, and the memory device, address generating means generates an intra-train address and a calculated address. The intra-train address is variable in response to the matching signal, the held nest bit, and the held data length code to select the selected tokens from the stored tokens. The selected tokens include the required data. The calculated address is the end address of each of the selected tokens and is calculated by using the intra-train address and the held data length code. Connected to the header register, the address generating means, and the checking means, decision means decides a decided nest level by using the calculated address, the intra-train address, and the held nest bit. The decided nest level indicates one of the first through the N-th nest levels that is selected as the selected level. The decision means supplies the decided nest level code representative of the decided nest level to the checking means.

DESCRIPTION OF THE PREFERRED EMBODIMENTS

Referring to FIGS. 1(a) through (e), description transmitted between heterogeneous data processing systems (not shown). The token train comprises a plurality of tokens. Each of the tokens is given by a nest level selected from first through N-th nest levels as a selected level, where N represents a predetermined natural number which is equal to, for example, sixty-four. The first through the n-th nest levels are a lowest through a highest nest level, respectively.

Each of the tokens comprises a header and a data set. The data set is either data, such as DATA(1) through DATA(4), or a text, such as TX(1) through TX(4). The data DATA (suffixes omitted) may correspond to a body of a letter, which may be a business letter. The text TX (suffixes omitted) may correspond to a title or a gist of the letter. The data set has a data length and is for nesting one of the tokens that has a higher nest level than a selected level, by one level and will be referred to as a particular token. The header comprises a data length code, such as LL(1) through LL(8), representative of the data length and a data identifier code representative of a processing function of the data set. The data identifier code consists of first through eighth bits. A sixth bit of the data identifier code is a nest bit indicative of whether or not the particular token is nested in the data set. The data identifier code is depicted at ID* (suffixes omitted) when the nest bit indicates that the particular token is nested in the data set. In this event, the nest bit may be a binary one bit. The data identifier code is depicted at ID (suffixes omitted) if the nest bit indicates that the particular token is not nested in the data set. Under the circumstances, the nest bit is a binary zero bit.

It will be assumed that tokens illustrated in FIGS. 1(a) to (d) are given first, second, third, and fourth nest levels, respectively. The first through the fourth nest levels are represented by first, second, third, and fourth nest level codes which are equal to "00", "01", "10", and "11", respectively.

Figure 1:
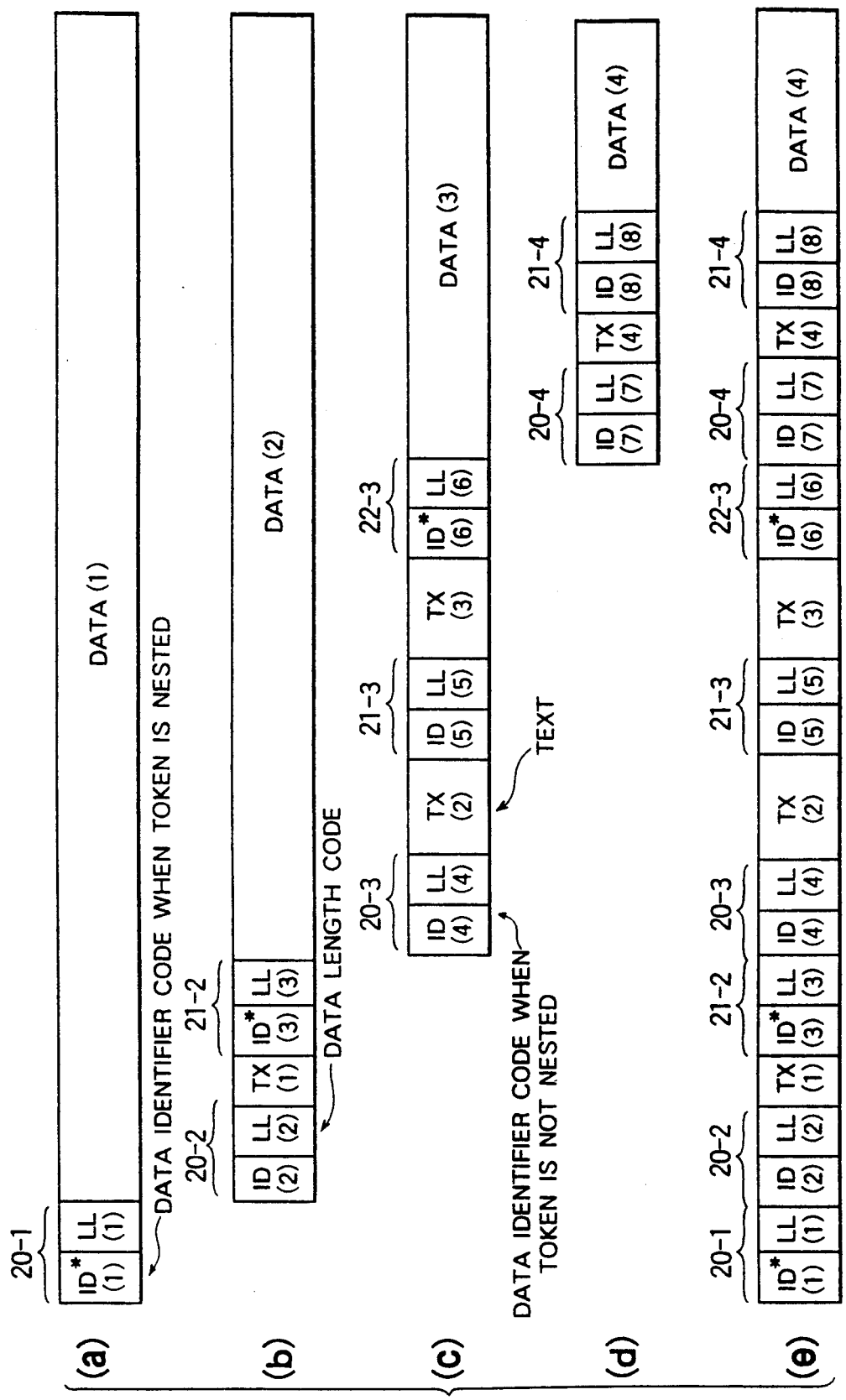
FIGS. 1(a) through (e) show examples of tokens having different nest levels and a token train comprising the tokens supplied to a token train retrieval device according to the present invention.

In FIG. 1(a), a token having the first nest level comprises a header 20-1 in addition to the data DATA(1). The header 20-1 comprises a data identifier code ID*(1) including a nest bit of the binary one and the data length code LL(1). Therefore, the DATA(1) nests a plurality of tokens, each having the second nest level, as shown in FIG. 1(b). The token having the nest bit of the binary one such as the token illustrated in FIG. 1(a) will be called a constructor token. On the contrary, the token having the nest bit of the binary zero will be called a primitive token.

In FIG. 1(b), one of tokens that has the second nest level, comprises a header 20-2 and the text TX(1). Another of tokens that has the second nest level comprises a header 21-2 and the data DATA(2). The header 20-2 comprises a data identifier code ID(2) including a nest bit of binary zero and the data length code LL(2). The header 21-2 comprises a data identifier code ID*(3) including a nest bit of the binary one and the data length code LL(3). Therefore, the data DATA(2) nests a plurality of tokens, each having the third nest level, as shown in FIG. 1(c).

In FIG. 1(c), one of tokens that has the third nest level, comprises a header 20-3 and the text TX(2). Another of tokens has the third nest level comprises a header 21-3 and the text TX(3). Still another of tokens that has the third nest level comprises a header 22-3 and the data DATA(3). The header 20-3 comprises a data identifier code ID(4) and the data length code LL(4). The header 21-3 comprises a data identifier code ID(5) and the data length code LL(5). The header 22-3 comprises a data identifier code ID*(6) and the data length code LL(6). Therefore, the data DATA(3) nests a plurality of tokens, each having the fourth nest level, as shown in FIG. 1(d).

In FIG. 1(d), one of tokens that has the fourth nest level, comprises a header 20-4 and the text TX(4). Another of tokens that has the fourth nest level comprises a header 21-4 and the data DATA(4). The header 20-4 comprises a data identifier code ID(7) and the data length code LL(7). The header 21-4 comprises a data identifier code ID(8) and the data length code LL(8).

Referring to FIG. 1(e), the illustrated token train comprises the tokens as shown in FIGS. 1(a) to (d). It is assumed that the data length codes LL(1), LL(2), LL(3), LL(4), LL(5), LL(6), LL(7), and LL(8) are representative of data lengths L1, L2, L3, L4, L5, L6, L7, and L8, respectively. In addition, the headers 20-1, 20-2, 21-2, 20-3, 21-3, 22-3, 20-4, and 21-4 have header lengths LH1, LH2, LH3, LH4, LH5, LH6, LH7, and LH8, respectively.

It should be noted here that the data length is defined so as to make the data length comprise the header lengths. In this event, those lengths are related to one another by:

$$L1 = LH2 + L2 + LH3 + L3, \quad (1)$$

$$L3 = LH4 + L4 + LH5 + L5 + LH6 + L6, \quad (2)$$

and $$L6 = LH7 + L7 + LH8 + L8, \quad (3)$$

It is possible in general to understand that, when a token having an i-th nest level comprises a data identifier code ID*, a data length code LL(i) representative of a data length Li, and a data set DATA(i), another token having an (i+1)-th nest level is nested in the data set DATA(i), where i represents a natural number not greater than the predetermined natural number N less one. After being supplied with the data set DATA(i), the nest level, namely, a selected level is returned to the i-th nest level.

In the illustrated example of FIG. 1(e), the selected level is shifted, from the first nest level to the second nest level after being supplied with the header 20-1. After the header 21-2 is supplied, the selected level is shifted from the second nest level to the third nest level. After the header 22-3 is supplied, the selected level is shifted from the third nest level to the fourth nest level. After the data DATA(4) is supplied, the selected level is shifted from the fourth nest level to the first nest level.

Figure 2:
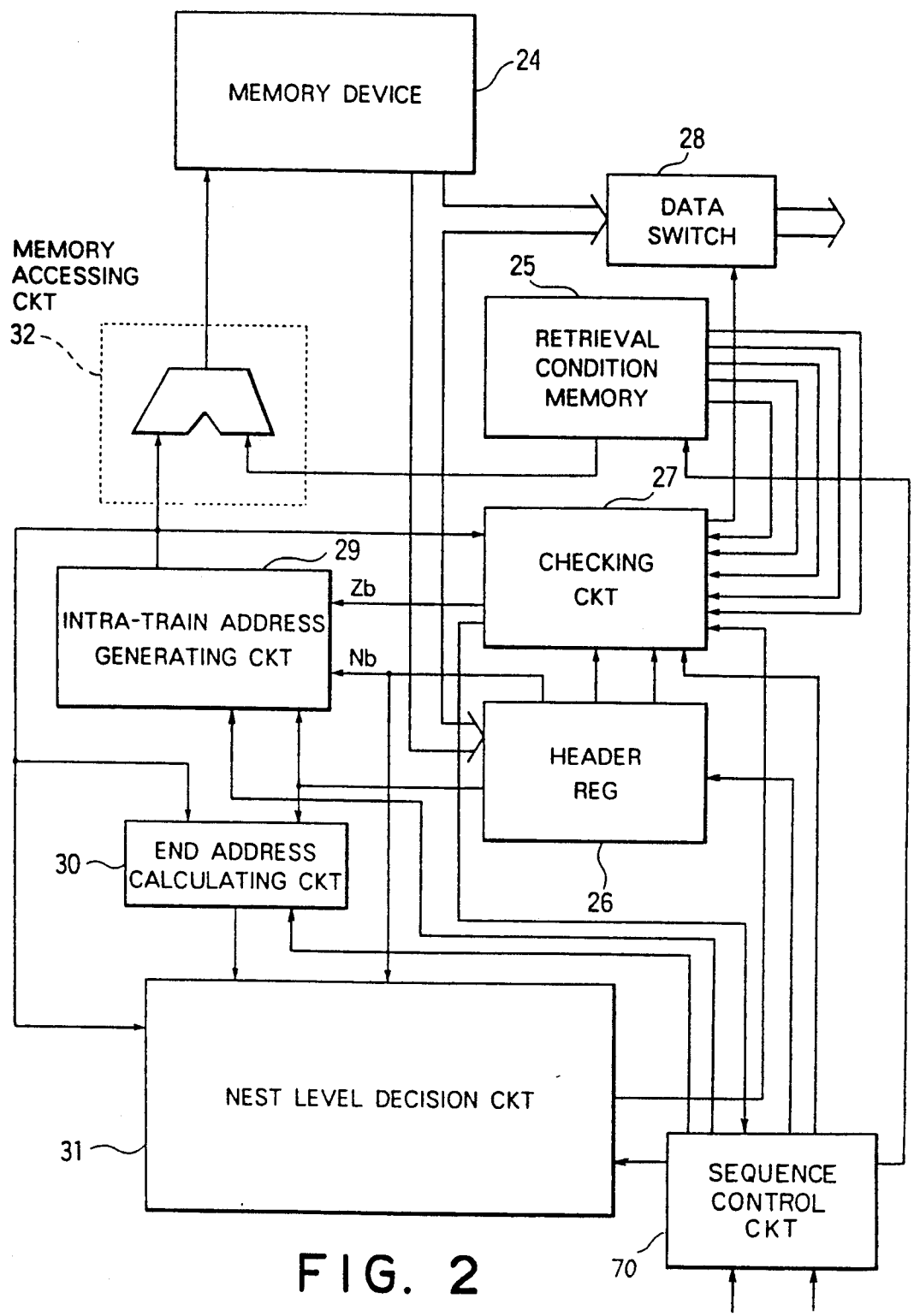
FIG. 2 is a block diagram of a token train retrieval device according to a first embodiment of the present invention.

Referring to FIG. 2, a token train retrieval device according to a first embodiment of the present invention includes a memory device 24 for memorizing, as stored tokens, the tokens illustrated in FIG. 1(e). Each of the stored tokens starts at a starting address and ends at an end address. The illustrated token train retrieval device is for retrieving the stored tokens to locate required data in the stored tokens that satisfy a retrieval condition.

The memory device 24 memorizes the stored tokens which starts at an initial address. The initial address is the starting address of one of the stored tokens that should be first read from the memory device 24.

The token train retrieval device comprises a retrieval condition memory 25 for preliminarily memorizing the retrieval condition as a stored condition.

The memory device 24 is connected to a header register 26. The header register 26 is supplied as a supplied header with the header of each of selected tokens selected from the stored tokens in the manner which will later be described. The header register 26 holds the data length code, the data identifier code, and the nest bit of the supplied header as a held data length code, a held data identifier code, and a held nest bit Nb, respectively.

The retrieval condition memory 25 and the header register 26 are connected to a checking circuit 27. The checking circuit 27 is supplied with a decided nest code in the manner which will later become clear. Responsive to the held data identifier code and to the decided nest level code, the checking circuit 27 checks whether or not the stored condition is satisfied in the manner which will later become clear. The checking circuit 27 produces a matching signal Zb of a binary one when the stored condition is satisfied. The checking circuit 27 supplies a valid signal to a data switch 28 in the manner which will later become clear. Responsive to the valid signal, the data switch 28 extracts the required data from the selected tokens to produce the required data. The checking circuit 27 supplies an end signal to a sequence control circuit 70 in the manner which will later become clear.

The header register 26 and the checking circuit 27 are connected to an intra-train address generating circuit 29. The intra-train address generating circuit 29 generates an intra-train address variable in response to the matching signal Zb, the held nest bit Nb, and the held data length code to select the selected tokens from the stored tokens. The selected tokens include the required data.

The intra-train address generating circuit 29 and the header register 26 are connected to an end address calculating circuit 30. The end address calculating circuit 30 calculates the end address of each of the selected tokens as a calculated address by using the intra-train address and the held data length code.

The header register 26, the intra-train address generating circuit 29, the end address calculating circuit 30, and the checking circuit 27 are connected to a nest level decision circuit 31. The nest level decision circuit 31 decides a decided nest level by using the calculated address, the intra-train address, and the held nest bit. The decided nest level indicates one of the first through the N-th nest levels that is selected as the selected level. The nest level decision circuit 31 supplies the decided nest level code representative of the decided nest level to the checking circuit 27.

The intra-train address generating circuit 29, the checking circuit 27, and the memory device 24 are connected to a memory accessing circuit 32. The memory accessing circuit 32 accesses the memory device 24 by an access address representative of a sum of the initial address and the intra-train address to read the selected trains.

The sequence control circuit 70 is connected to the retrieval condition memory 25, the header register 26, the checking circuit 27, the intra-train address generating circuit 29, the end address calculating circuit 30, and the nest level decision circuit 31 which are referred to a controlled circuit. The sequence control circuit 70 is supplied with a start signal and a clock signal. Responsive to the start signal, the clock signal, and the end signal, the sequence control circuit 70 controls the controlled circuit in accordance with state transition of retrieval operation in the manner which will later become clear.

Figure 3:
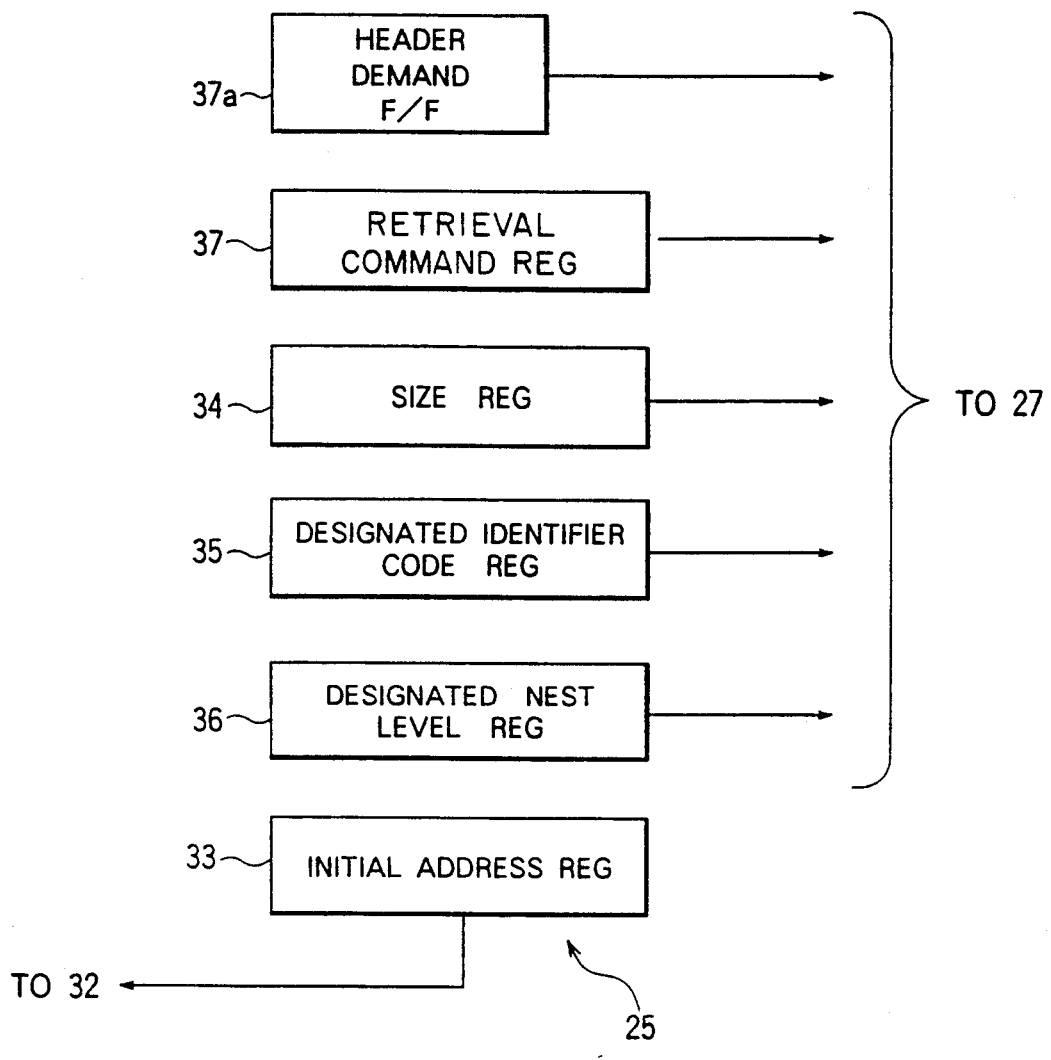
FIG. 3 is a block diagram of a retrieval condition memory for use in the token train retrieval device depicted in FIG. 2.

Turning to FIG. 3, the retrieval condition memory 25 comprises an initial address register 33, a size register 34, a designated identifier code register 35, a designated nest level register 36, and a retrieval command register 37. The initial address register 33 preliminarily holds the initial address. The initial address register 33 is connected to the memory accessing circuit 32. The size register 34 preliminarily memorizes a size code representative of a size of the stored tokens. The designated identifier code register 35 preliminarily holds a designated identifier code. The designated nest level register 36 preliminarily holds a designated nest level code indicative of a designated nest level as one of the first through the N-th nest levels. The retrieval command register 37 preliminarily holds a retrieval command represented by a predetermined bit pattern which designates at least one of the designated identifier code register 35 and the designated nest level register 36. All of the size register 34, the designated identifier code register 35, the designated nest level register 36, and the retrieval command register 37 are connected to the checking circuit 27.

In FIG. 3, the retrieval condition memory 25 further comprises a header demand flip-flop 37a for preliminarily holding a header demand signal indicative of a header demand. The header demand flip-flop 37a holds the header demand signal of the binary one when the header is demanded.

Figure 4:
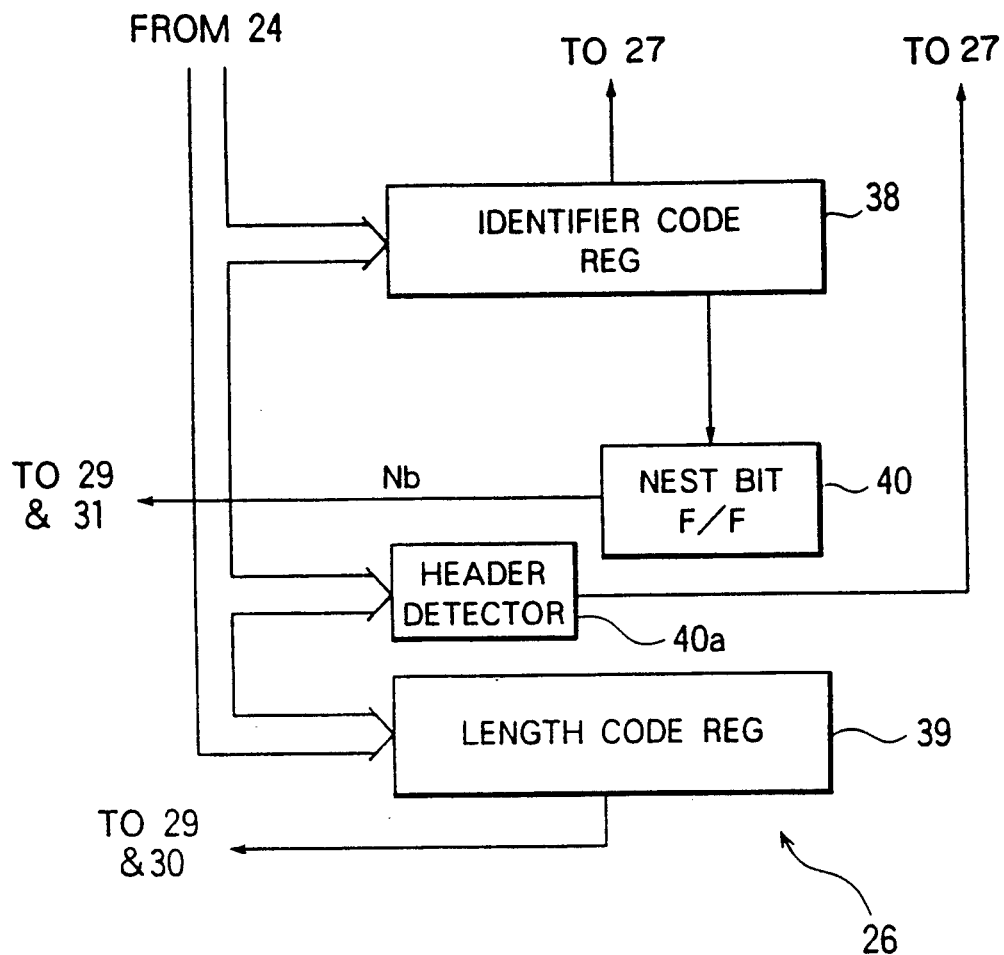
FIG. 4 is a block diagram of a header register for use in the token train retrieval device depicted in FIG. 2.

Turning to FIG. 4, the header register 26 comprises an identifier code register 38, a length code register 39, and a nest bit flipflop 40. The identifier code register 38 holds the data identifier code of the supplied header as the held data identifier code. The identifier code register 38 is connected to the checking circuit 27. The length code register 39 holds the data length code of the supplied header as the held length code. The length code register 39 is connected to the intra-train address generating circuit 29 and the end address calculating circuit 30. The nest bit flip-flop 40 holds the nest bit of the supplied header as the held nest bit Nb. The nest bit flip-flop 40 is connected to the intra-train address generating circuit 29 and the nest level decision circuit 31.

The header register 26 further comprises a header detector 40a for detecting the supplied header. The header detector 40a produces a header detection signal of the binary one when the supplied header is detected.

Figure 5:
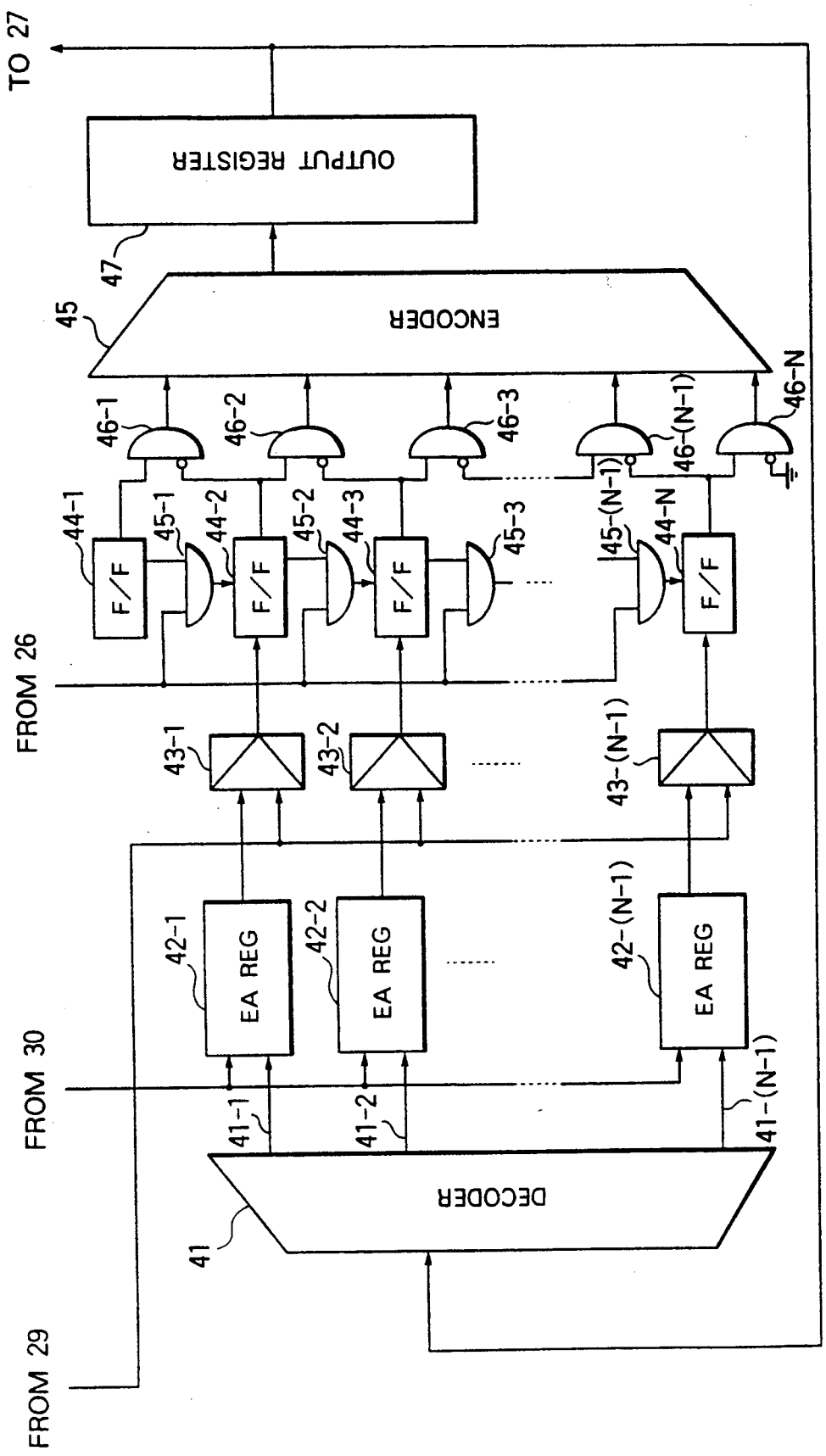
FIG. 5 is a block diagram of a nest level decision circuit for use in the token train retrieval device depicted in FIG. 2.

Turning to FIG. 5, the nest level decision circuit 31 comprises a decoder 41 having first through (N-1)-th output lines 41-1, 41-2, ..., and 41-(N-1) in correspondence to the first through the (N-1)-th nest levels, respectively. The nest level decision circuit 31 is supplied with the decided nest level code. The nest level decision circuit 31 is for decoding the decided nest level code into a decoded signal indicative of a particular one of the first through the (N-1)-th output lines 41-1 to 41-(N-1) to put the particular output line into an active state.

The first through the (N-1)-th output lines 41-1 to 41-(N-1) are connected to first through (N-1)-th end address (EA) registers 42-1, 42-2, ..., and 42-(N-1), respectively. The first through the (N-1)-th end address registers 42-1 to 42-(N-1) are connected to the end address calculating circuit 30 in common. The first through the (N-1)-th end address registers 42-1 to 42-(N-1) hold, as first through (N-1)-th held addresses, the calculated address when the first through the (N-1)-th output lines 41-1 to 41-(N-1) are put into the active state, respectively.

The first through the (N-1)-th end address registers 42-1 to 42-(N-1) are connected to first through (N-1)-th address comparators 43-1, 43-2, ..., and 43-(N-1), respectively. The first through the (N-1)-th address comparators 43-1 to 43-(N-1) are connected to the intra-train address generating circuit 29 in common. The first through the (N-1)-th address comparators 43-1 to 43-(N-1) compare the intra-train address with the first through the (N-1)-th held addresses. The first through the (N-1)-th address comparators 43-1 to 43-(N-1) produce first through (N-1)-th reset signals when the intra-train address becomes not less than the first through the (N-1)-th held addresses, respectively.

A first flag bit flip-flop 44-1 produces a first flag bit signal representative of a binary one. The first flag bit flip-flop 44-1 is connected to a second flag bit flip-flop 44-2 through a first AND gate 45-1. The second flag bit flip-flop 44-2 is connected to a third flag bit flip-flop 44-3 through a second AND gate 45-2. Similarly, the third flag bit flip-flop 44-3 is connected to a fourth flag bit flip-flop (not shown) through a third AND gate 45-3. An (N-1)-th flag bit flip-flop (not shown) is connected to an N-th flag bit flip-flop 44-N through an (N-1)-th AND gate 45-(N-1). That is, the first through the N-th flag bit flip-flops 44-1 to 44-N is connected to one another in cascade through the first through the (N-1)-th AND gates 45-1 to 45-(N-1). The second through the N-th flag bit flip-flops 44-2 to 44-N are connected to the first through the (N-1)-th address comparators 43-1 to 43-(N-1), respectively. The second through the N-th flag bit flip-flops 44-2 to 44-N are connected to the nest bit flip-flop 40 (FIG. 4) of the header register 26 through the first through the (N-1)-th AND gates 45-1 to 45-(N-1).

The second flag bit flip-flop 44-2 produces a second flag bit signal representative of the binary one when the nest bit flip-flop 40 produces the held nest bit representative of the binary one furthermore when the first flag bit flip-flop 44-1 produces the first flag bit signal of the binary one. Similarly, the third flag bit flip-flop 44-3 produces a third flag bit signal representative of the binary one when the nest bit flip-flop 40 produces the held nest bit representative of the binary one furthermore when the second flag bit flip-flop 44-2 produces the second flag bit signal of the binary one. Likewise, the N-th flag bit flip-flop 44-N produces an N-th flag bit signal representative of the binary one when the nest bit flip-flop 40 produces the held nest bit representative of the binary one furthermore when an (N-1)-th flag bit flip-flop (not shown) produces an (N-1)-th flag bit signal of the binary one.

The first through the N-th flag bit flip-flops 44-1 are connected to an encoder 45 through first through N-th inhibit gates 46-1, 46-2, 46-3, ..., 46-(N-1), and 46-N. More specifically, the first inhibit gate 46-1 is supplied with the first flag bit signal directly and with the second flag bit signal through an inhibit terminal indicated by a white circle. Supplied with the first flag bit signal of the binary one and the second flag bit signal of the binary zero, the first inhibit gate 46-1 produces a first gate signal having the binary one. Likewise, the second inhibit gate 46-2 produces a second gate signal of the binary one on reception of the second flag bit signal of the binary one and the third flag bit signal of the binary zero. This applies to the third through the N-th inhibit gates 46-3 to 46-N. At any rate, the first through the N-th inhibit gates 46-1 to 46-N produce the first through the N-th gate signals, respectively. Supplied with the first through the N-th gate signals, the encoder 45 encodes the first through the N-th gate signals into an encoded signal. At any rate, the encoder 45 encodes, in cooperation with the first through the N-th inhibit gates 46-1 to 46-N, the first through the N-th flag bit signals into the encoded signal.

The encoder 45 is connected to a nest level output register 47. The nest level output register 47 holds the encoded signal to produce a held encoded signal as the decided nest level code. The decided nest level code is delivered from the nest level output register 47 to the decoder 41 and the checking circuit 7 (FIG. 2).

Figure 6:
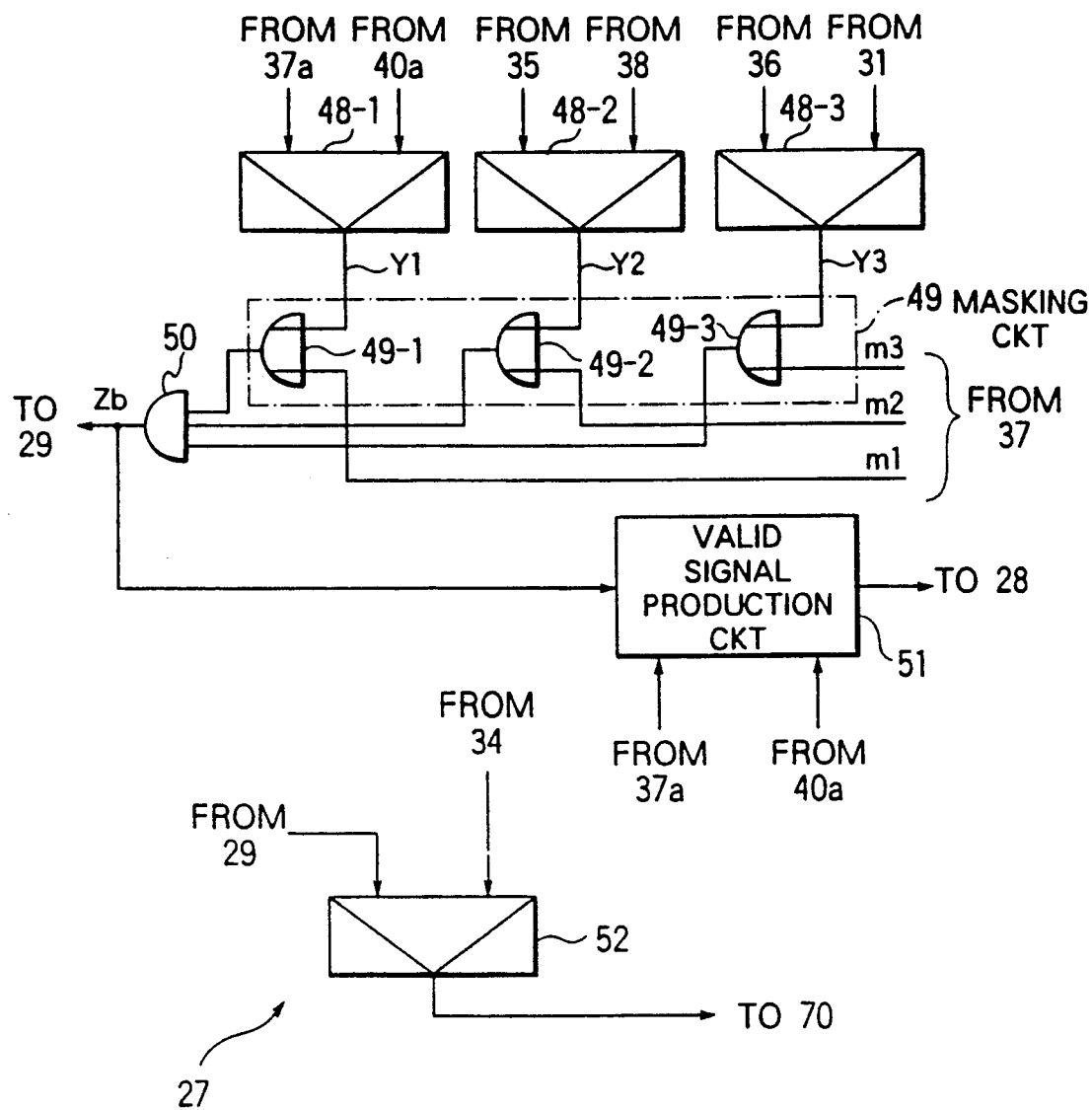
FIG. 6 is a block diagram of a checking circuit for use in the token train retrieval device depicted in FIG. 2.

Referring to FIG. 6, the checking circuit 27 comprises first through third comparators 48-1, 48-2, and 48-3. The first through the third comparators 48-1 to 48-3 are called a header comparator, an identifier code comparator, and a nest level comparator, respectively.

The header comparator 48-1 is connected to the header demand flip-flop 37a (FIG. 3) and the header detector 40a (FIG. 4). The header comparator 48-1 compares the header demand signal with the header detection signal. The header comparator 48-1 produces a first comparison signal y1 or a header comparison signal representing whether or not the header demand signal matches with the header detection signal. More particularly, the header comparator 48-1 produces the header comparison signal y1 of the binary one when the header demand signal matches with the header detection signal. Otherwise, the header comparator 48-1 produces the header comparison signal y1 of the binary zero.

The identifier code comparator 48-2 is connected to the designated identifier code register 35 (FIG. 3) and the identifier code register 38 (FIG. 4) of the header register 26. The identifier code comparator 48-2 compares the designated identifier code with the held data identifier code. The identifier code comparator 48-2 produces a second comparison signal y2, namely, an identifier comparison signal representing whether or not the designated identifier code matches with the held data identifier code. More specifically, the identifier code comparator 48-2 produces the identifier comparison signal y2 of the binary one when the designated identifier code matches with the held data identifier code. Otherwise, the identifier code comparator 48-2 produces the identifier comparison signal y2 of the binary zero.

The nest level comparator 48-3 is connected to the designated nest level register 36 (FIG. 3) and the nest level decision circuit 31 (FIG. 2). The nest level comparator 48-3 compares the designated nest level code with the decided nest level code to produce a third comparison signal y3 or a nest level comparison signal. In the example being illustrated, the nest level comparator 48-3 produces the nest level comparison signal of the binary one when the designated nest level matches with the decided nest level. Otherwise, the nest level comparator 48-3 produces the nest level comparison signal of the binary zero.

The header comparator 48-1, the identifier code comparator 48-2, and the nest level comparator 48-3 are connected to a masking circuit 49. The masking circuit 49 are supplied with the predetermined bit pattern representing the retrieval command from the retrieval command register 37 (FIG. 3). The masking circuit 49 is for masking the header comparison signal y1, the identifier code comparison signal y2, and the nest level comparison signal y3 by using the predetermined bit pattern to produce a masked header signal, a masked identifier signal, and a masked nest level signal.

More particularly, the predetermined bit pattern includes first through third mask bits m1, m2, and m3. The first through the third mask bits m1 to m3 are referred to as a data set mask bit, an identifier code matching mask bit, and a nest level matching mask bit, respectively. The masking circuit 49 comprises first through third OR gates 49-1, 49-2, and 49-3. Supplied with the header comparison signal y1 and the data set mask bit m1, the first OR gate 49-1 produces a first OR'ed signal as the masked header signal. Supplied with the identifier code comparison signal y2 and the identifier code matching mask bit m2, the second OR gate 49-2 produces a second OR'ed signal as the masked identifier signal. Supplied with the nest level comparison signal y3 and the nest level matching mask bit m3, the third OR gate 49-3 produces a third OR'ed signal as the masked nest level signal.

The masking circuit 49 is connected to an AND gate 50. Supplied with the masked header signal, the masked identifier signal, and the masked nest level signal, the AND gate 50 produces an AND'ed signal as the matching signal Zb. That is, the AND gate 50 serves as a processing arrangement for processing the masked header signal, the masked identifier signal, and the masked nest level signal to produce a processed signal as the matching signal Zb.

In the example being illustrated, the matching circuit 27 only comprises three comparators 48-1 to 48-3 and are supplied with the predetermined bit pattern having three mask bits m1 to m3. In general, the matching circuit 27 may comprise first through M-th comparators 48-1 to 48-M and may be supplied with the predetermined bit pattern having first through M-th mask bits m1 to mM, where M represents a predetermined positive integer. Under the circumstances, the first through the M-th comparators 48-1 to 48-M produce first through M-th comparison signals y1 to yM. In this event, the matching signal Zb is given, by using the first through the M-th comparison signals y1 to yM and the first through the M-th mask bits m1 to mM, by an equation:

$$Zb = (y1 + m1) \times (y2 + m2) \times x \ldots x (yM + mM), \quad (4)$$

where the symbols + and x represent an OR and an AND operator, respectively.

Although the third or the nest level comparator 48-3 produces the nest level comparison signal representative of whether or not the designated nest level matches with the decided nest level, the nest level comparator 48-3 may produce the nest level comparison signal representative of whether or not the designated nest level is greater than the decided nest level.

The matching signal Zb is supplied to a valid signal production circuit 51. The valid signal production circuit 51 is connected to the header demand flip-flop 37a (FIG. 3) and the header detector 40a (FIG. 4). Responsive to the header demand signal and the header detection signal, the valid signal production circuit 51 modifies the matching signal Zb into a modified signal. The modified signal is delivered to the data switch 28 (FIG. 2) as the valid signal. More particularly, the valid signal production circuit 51 produces the matching signal Zb as the valid signal as it is on reception of the header demand signal indicative of the binary one. On reception of the header demand signal indicative of the binary zero, the valid signal production circuit 51 produces the valid signal equivalent to the matching signal Zb except for a time duration of the header detection signal indicative of the binary one.

The checking circuit 27 further comprises a comparator 52 connected to the size register 34 (FIG. 3) and the intra-train address generating circuit 29. The comparator 52 compares the intra-train address with the size code. When the intra-train address is equal to or greater than the size code, the comparator 52 produces the end signal which will later be described.

Figure 7:
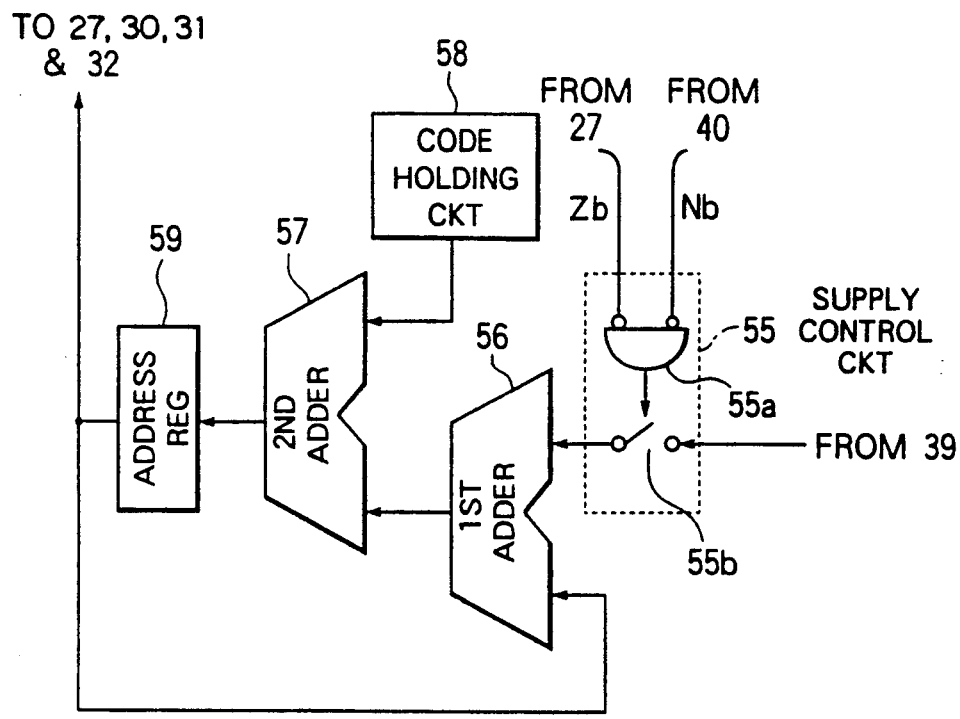
FIG. 7 is a block diagram of an intra-train address generating circuit for use in the token train retrieval device depicted in FIG. 2.

Turning to FIG. 7, the intra-train address generating circuit 29 is for use in the token train retrieval device illustrated in FIG. 2. The intra-train address generating circuit 29 generates the intra-train address variable to indicate a current address and later a renewed address.

The illustrated intra-train address generating circuit 29 is supplied with the held data length code, the held nest bit Nb, and the matching signal Zb from the length code register 39 (FIG. 4), the nest bit flip-flop 40 (FIG. 4), and the checking circuit 27 (FIG. 2), respectively.

The intra-train address generating circuit 29 comprises a supply control circuit 55, a first adder 56, a second adder 57, a code holding circuit 58, and an address register 59.

The supply control circuit 55 is connected to the length code register 39, the nest bit flip-flop 40, the checking circuit 27, and the first adder 56. The supply control circuit 55 controls supply of the held data length code to the first adder 56 to produce a controlled code. The supply control circuit 55 produces the held data length code as the controlled code only when both of the held nest bit Nb and the matching signal Zb indicate the binary zero. The supply control circuit 55 produces a zero value code representative of a value zero as the controlled code when at least one of the held nest bit and the matching signal indicates the binary one.

More specifically, the supply control circuit 55 comprises a NOR gate 55a and a switch 55b. Supplied with the held nest bit Nb and the matching signal Zb, the NOR gate 55a produces a NOR'ed signal. That is, the NOR gate 55a produces the NOR'ed signal of the binary one only when both of the held nest bit Nb and the matching signal Zb indicate the binary zero. Otherwise, the NOR gate 55a produces the NOR'ed signal of the binary zero. Responsive to the NOR'ed signal of the binary one, the switch 55b turns on to supply the held data length code as the controlled code to the first adder 56. Responsive to the NOR'ed signal of the binary zero, the switch 55b turns off to supply the zero value code as the controlled code to the first adder 56.

The first adder 56 is supplied with the intra-train address of the current address and the controlled code. The first adder 56 calculates a first sum of the current address plus the controlled code. The first adder 56 produces a first sum address representative of the first sum.

The code holding circuit 58 holds a one value code representative of a value one.

The second adder 57 is connected to the code holding circuit 58 and the first adder 56. The second adder 57 calculates a second sum of the one value code plus the first sum address. The second adder 57 produces a second sum address representative of the second sum.

The address register 59 is connected to the second address 59. The address register 59 holds the second sum address as the intra-train address of the renewed address. The renewed address is supplied to the first adder 56 afresh as the current address. The renewed address is also supplied to the checking circuit 27 (FIG. 2), the end address calculating circuit 30 (FIG. 2), the nest level decision circuit 31 (FIG. 2), and the memory accessing circuit 32 (FIG. 2).

Figure 8:
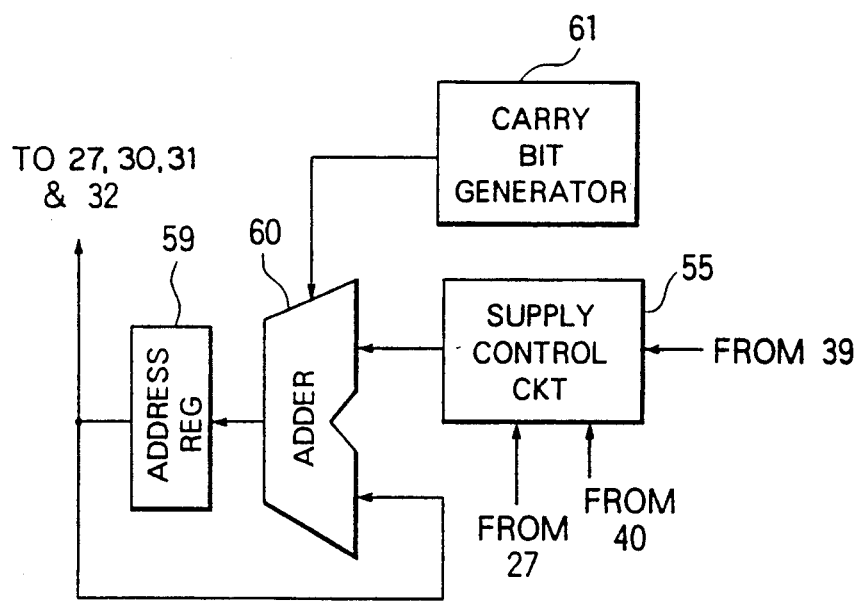
FIG. 8 is a block diagram of another intra-train address generating circuit for use in the token train retrieval device depicted in FIG. 2.

Turning to FIG. 8, the intra-train address generating circuit 29 is also for use in the token train retrieval device illustrated in FIG. 2.

The illustrated intra-train address generating circuit 29 comprises the supply control circuit 55, the address register 59, an adder 60, and a carry bit generator 61.

The carry bit generator 61 generates a predetermined bit representative of the binary one. Herein, the predetermined bit will be called a carry bit. The carry bit generator 61 is connected to the adder 60. The adder 60 is supplied with the intra-train address of the current address and the controlled code. The adder 60 calculates a three-term sum of the current address plus the controlled code plus the carry bit. The adder 60 produces a sum address representative of the sum. The sum address is held in the address register 59 as the intra-train address of the renewed address.

Figure 9:
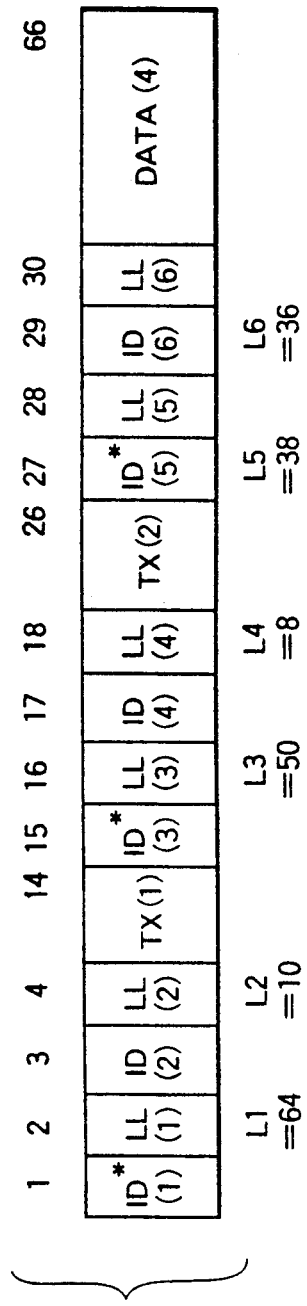
FIG. 9 shows an example of tokens memorized in a memory device for use in the token train retrieval device depicted in FIG. 2.
Figure 10:
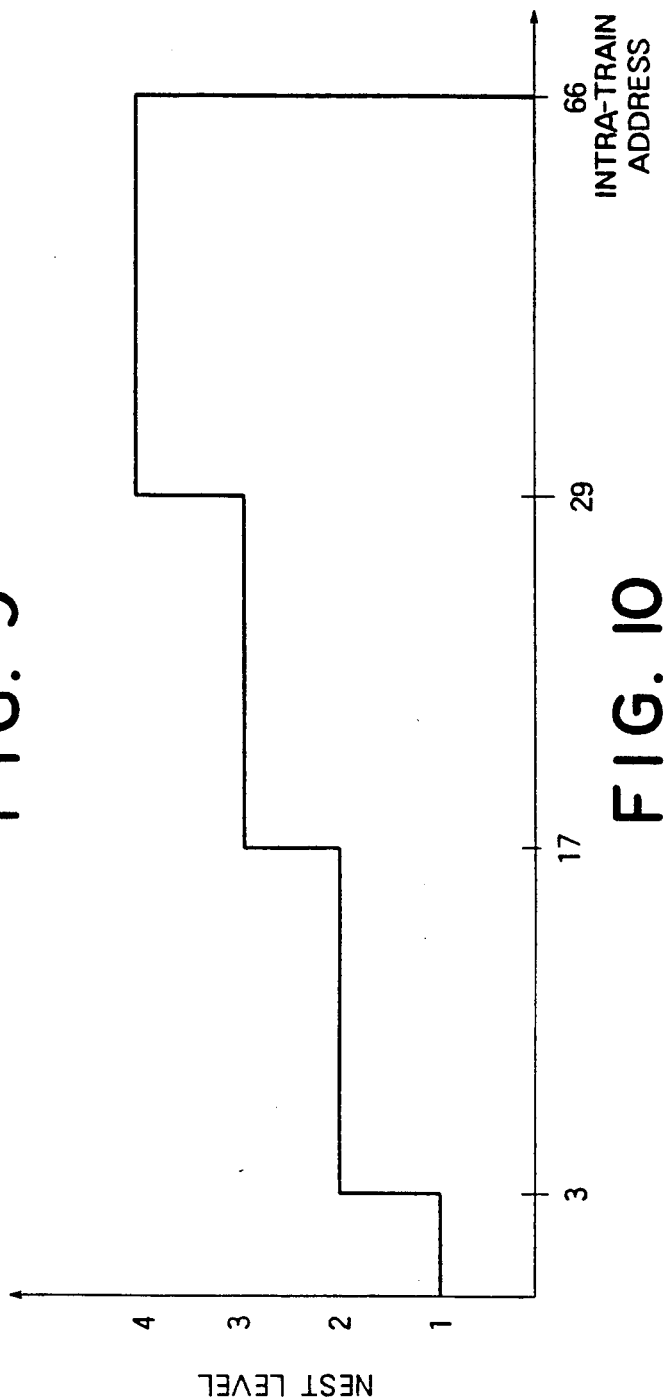
FIG. 10 is a graphical representation for use in describing variation of a nest level.

Referring to FIGS. 9 and 10, the description will be made as regards the relation between the intra-train address and the nest level. For the example being illustrated, the predetermined natural number N is equal to four. The initial address is equal to an address of a first octet. Therefore, the access address is equal to the intra-train address. The intra-train addresses are indicated along a first or top line in FIG. 9 by numerals 1 through 66. It will be assumed that the token train retrieval device is supplied with a token train as shown along a second line from the top in FIG. 9.

The illustrated token train has a size equal to sixty-six octets and comprises first through sixth tokens. The first through the sixth tokens are memorized in the memory device 24 (FIG. 2) as first through sixth stored tokens which starts at the initial address of the first octet and ends at a final address of a sixty-sixth octet.

The first stored token is the constructor token having the first nest level of level one and has a first header and a first data set. The first header has a first identifier code ID*(1) including the nest bit of the binary one and has a first data length code LL(1) indicative of a first length L1 which is equal to sixty-four octets. The first header has a first header length LH1 equal to two octets. The first stored token starts at a first starting address equal to the initial address and ends at a first end address equal to the final address. Inasmuch as the first token is the constructor token, the second through the sixth tokens are nested in the first data set.

The second stored token is the primitive token and has a second header and a second data set depicted at TX(1). The second header has a second identifier code ID(2) including the nest bit of the binary zero and has a second data length code LL(2) indicative of a second length L2 which is equal to ten octets. The second stored token starts at a second starting address of a third octet and ends at a second end address of a fourteenth octet. Inasmuch as the second token is the primitive token, no token is nested in the second data set.

The third stored token is the constructor token and has a third header and a third data set. The third header has a third identifier code ID*(3) including the nest bit of the binary one and has a third data length code LL(3) indicative of a third length L3 which is equal to fifty octets. The third header has a third header length LH2 equal to two octets. The third stored token starts at a third starting address of fifteenth octet and ends at a third end address equal to the final address. Inasmuch as the third token is the constructor token, the fifth and the sixth tokens are nested in the third data set.

The fourth stored token is the primitive token and has a fourth header and a fourth data set depicted at TX(2). The fourth header has a fourth identifier code ID(4) including the nest bit of the binary zero and has a fourth data length code LL(4) indicative of a fourth length L4 which is equal to eight octets. The fourth stored token starts at a fourth starting address of a seventeenth octet and ends at a fourth end address of a twenty-sixth octet. Inasmuch as the fourth token is the primitive token, no token is nested in the fourth data set.

The fifth stored token is the constructor token and has a fifth header and a fifth data set. The fifth header has a fifth identifier code ID*(5) including the nest bit of the binary one and has a fifth data length code LL(5) indicative of a fifth length L5 which is equal to thirty-eight octets. The fifth header has a fifth header length LH5 equal to two octets. The fifth stored token starts at a fifth starting address of a twenty-seventh octet and ends at a fifth end address equal to the final address. Inasmuch as the fifth token is the constructor token, the sixth token is nested in the fifth data set.

The sixth stored token is the primitive token and has a sixth header and a sixth data set depicted at DATA(4). The sixth header has a sixth identifier code ID(6) including the nest bit of the binary zero and has a sixth data length code LL(6) indicative of a sixth length L6 which is equal to thirty-six octets. The sixth stored token starts at a sixth starting address of a twenty-ninth octet and ends at a sixth end address equal to the final address. Inasmuch as the sixth token is the primitive token, no token is nested in the sixth data set.

As shown in FIG. 10, the decided nest level is shifted from the first nest level of level one to the second nest level of level two when the intra-train address reaches the second starting address of the third octet. The decided nest level is shifted from the second nest level of level two to the third nest level of level three when the intra-train address reaches the fourth starting address of the seventeenth octet. When the intra-train address reaches the sixth starting address of the twenty-ninth octet, the decided nest level is shifted from the third nest level to the fourth nest level of level four. The decided nest level is shifted from the fourth nest level to the first nest level without fail when the intra-train address reaches the final address of the sixty-sixth octet.

Referring to FIGS. 11, 12, 13, and 14, the description will proceed to operation of the token train retrieval device illustrated in FIG. 2. It will be presumed that the memory device 24 memorizes the token train exemplified in FIG. 9. FIGS. 11 to 14 show first through fourth retrieval examples of obtaining, by accessing the memory device 24, selected tokens including required data which satisfy first through fourth retrieval conditions, respectively.

In each of FIGS. 11 to 14, the abscissa and the ordinate represent the intra-train address and an access count for the memory device 24, respectively. The solid line indicates that the stored tokens are read from the memory device 24. The dashed line indicates that readout of the stored tokens is skipped.

It is noted that the memory device 24 is accessed during an access count equal to sixty-six when the stored tokens are successively read from the memory device 24 regardless of any retrieval condition. This is because the stored tokens have a size equal to sixty-six octets. Such an access count is referred to as a successive access count.

Figure 11:
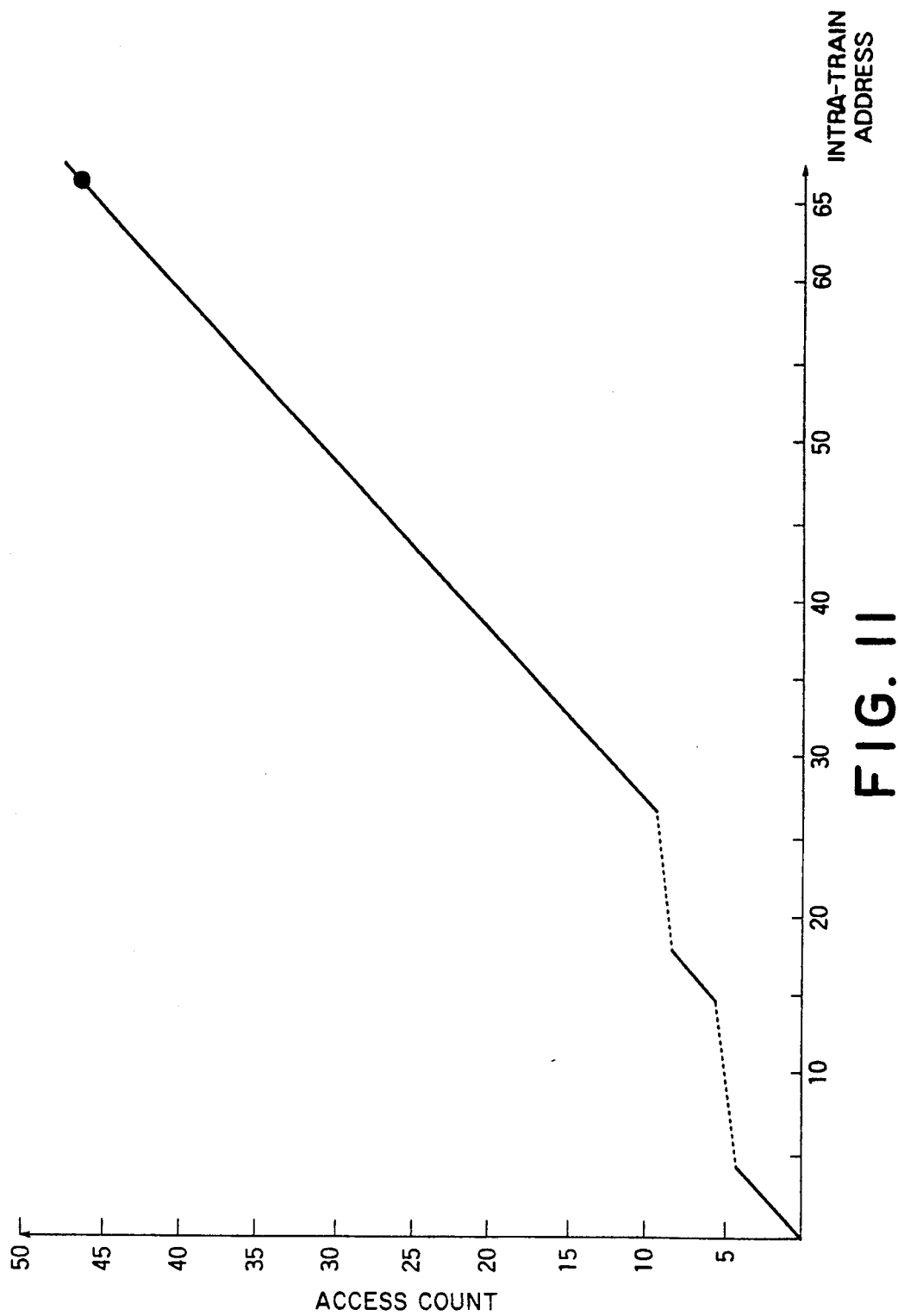
FIG. 11 shows a first retrieval example for use in describing operation of the token train retrieval device depicted in FIG. 2.

In FIG. 11 showing the first retrieval example, it will be assumed that the first retrieval condition has the designated nest level of level four and the designated identifier code is equal to the sixth identifier code ID(6). Under the circumstances, the retrieval command is represented by the predetermined bit pattern including the data set mask bit m1 of the binary one, the identifier code matching mask bit m2 of the binary zero, and the nest level matching mask bit m3 of the binary zero. In this event, the intra-train address varies as follows:

1, 2, 3, and 4;

15, 16, 17, and 18;

and 27, 28, 29, 30, 31, . . . , 65, and 66.

The intra-train address generating circuit 29 (FIG. 2) generates the intra-train address to read the required data from the memory device 24 while the intra-train address is situated between thirty-one and sixty-six. Therefore, the valid signal production circuit 51 produces the valid signal of the binary one, when the intra-train address is situated between thirty-one and sixty-six. The required data is available to protocol conversion, retrieval of a multi-media data base, or the like. The first retrieval example has an access count equal to forty-eight that is about two-thirds as large as the successive access count.

Figure 12:
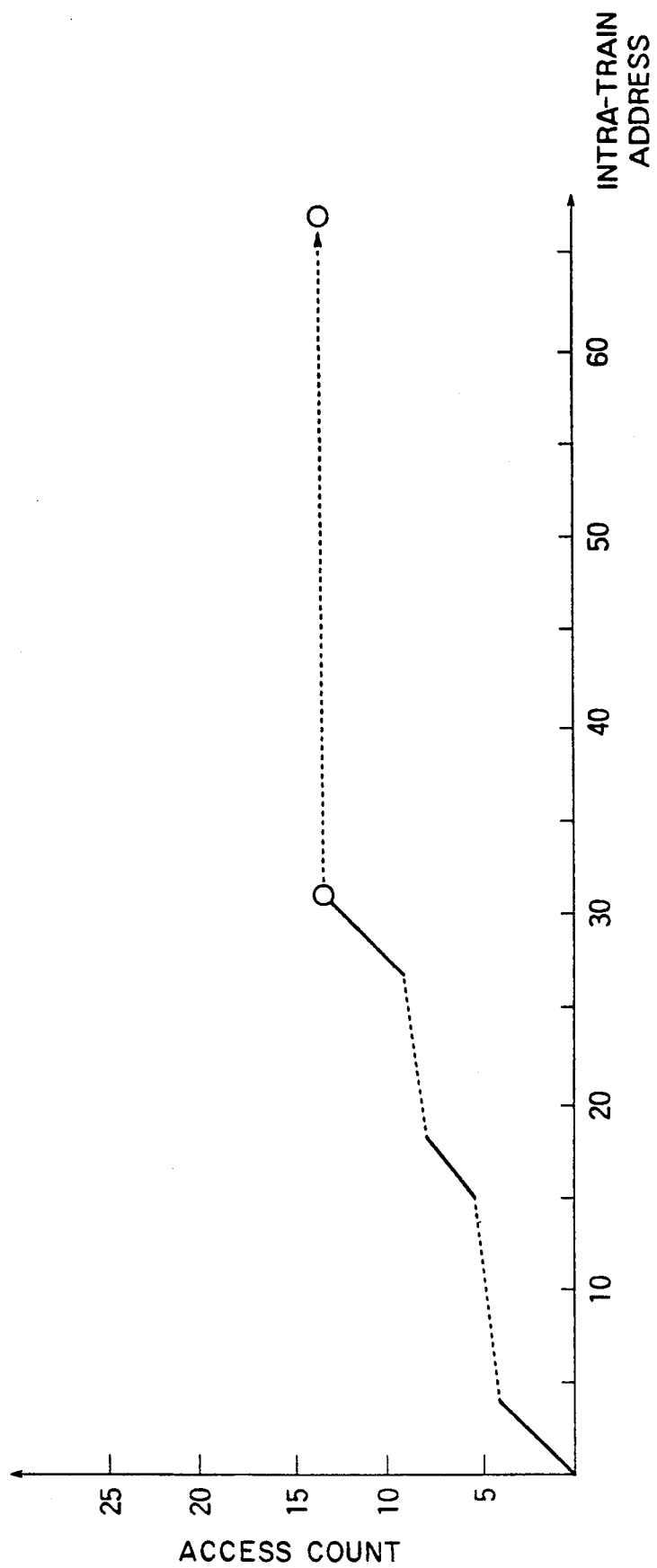
FIG. 12 shows a second retrieval example for use in describing another operation of the token train retrieval device depicted in FIG. 2.

In FIG. 12 showing the second retrieval example, it will be assumed that the second retrieval condition has the header demand. Under the circumstances, the retrieval command is represented by the predetermined bit pattern including the data set mask bit m1 of the binary zero, the identifier code matching mask bit m2 of the binary one, and the nest level matching mask bit m3 of the binary one. In this event, the intra-train address varies as follows:

1, 2, 3, and 4;

15, 16, 17, and 18;

and 27, 28, 29, 30, and 31.

The valid signal production circuit 51 produces the matching signal Zb as the valid signal as it is. Therefore, the data switch produces the header of each selected token as the required data. The required data is available to protocol analysis, conformance test, or the like. The second retrieval example has an access count equal to twelve that is about one-fifths as large as the successive access count.

Figure 13:
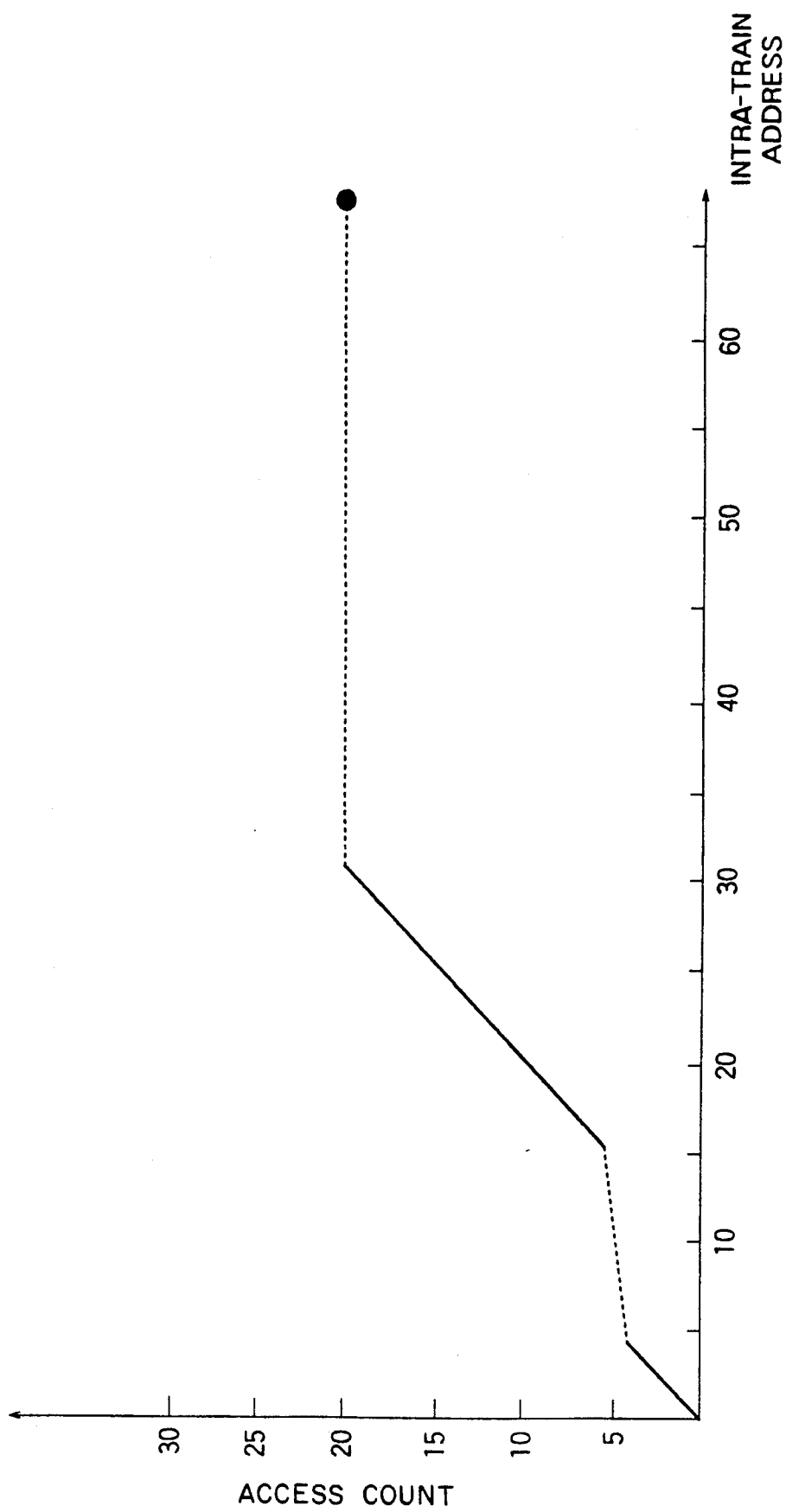
FIG. 13 shows a third retrieval example for use in describing still another operation of the token train retrieval device depicted in FIG. 2.

In FIG. 13 showing the third retrieval example, it will be assumed that the third retrieval condition has only the designated nest level of level three. Under the circumstances, the retrieval command is represented by the predetermined bit pattern including the data set mask bit m1 of the binary one, the identifier code matching mask bit m2 of the binary one, and the nest level matching mask bit m3 of the binary zero. In this event, the intra-train address varies as follows:

1, 2, 3, and 4;

and 15, 16, 17, 18, . . . , 29, and 30.

The intra-train address generating circuit 29 (FIG. 2) generates the intra-train address to read the required data from the memory device 24 while the intra-train address is situated between nineteen and twenty-six. Therefore, the valid signal production circuit 51 produces the valid signal of the binary one, when the intra-train address is situated between nineteen and twenty-six. Such a retrieval is for use in retrieving text data extracted from multi-media document data, in displaying pictorial data extracted from the multi-media document data, or in sorting numerical data extracted from multi-media document data. The third retrieval example has an access count equal to twenty that is about four-thirteenths as large as the successive access count.

Figure 14:
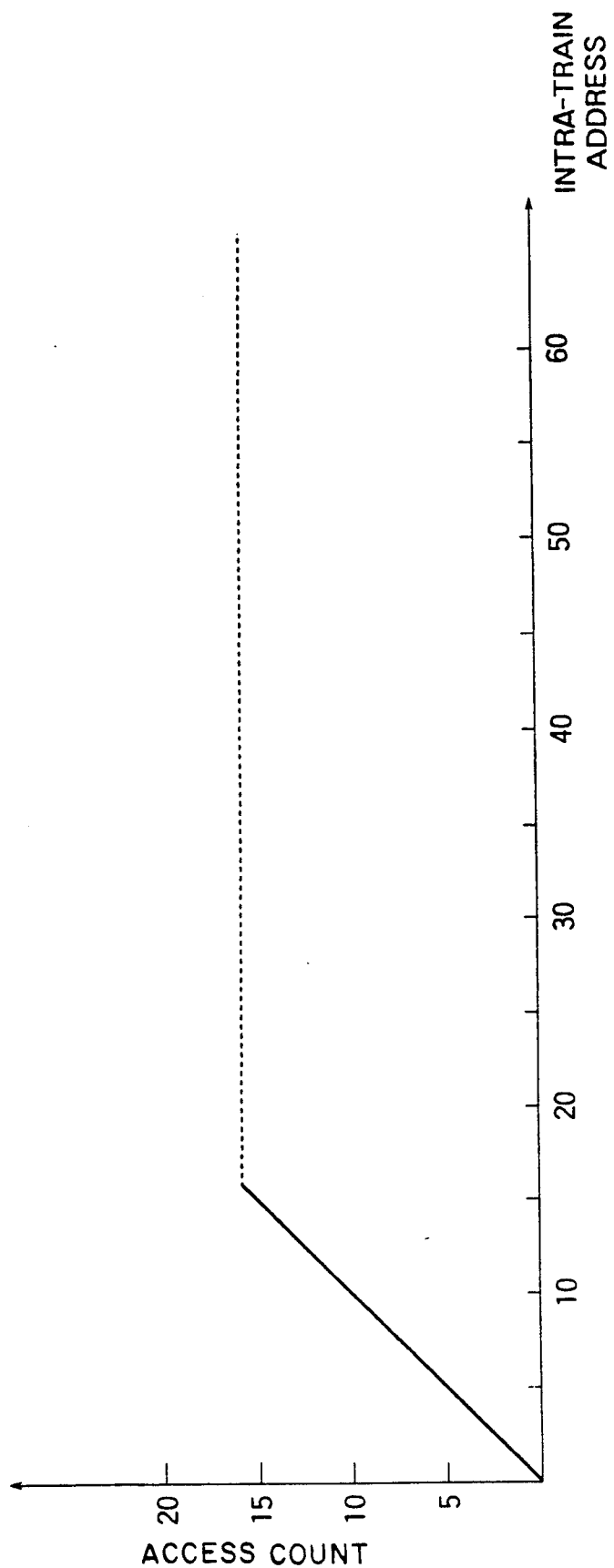
FIG. 14 shows a fourth retrieval example for use in describing yet another operation of the token train retrieval device depicted in FIG. 2.

In FIG. 14 showing the fourth retrieval example, it will be assumed that the third retrieval condition has only the designated nest level of level two rather than the nest level of level three. The fourth retrieval example is an example of retrieving the selected tokens having the nest level which is not greater than level two. Under the circumstances, the retrieval command is represented by the predetermined bit pattern including the data set mask bit m1 of the binary one, the identifier code matching mask bit m2 of the binary one, and the nest level matching mask bit m3 of the binary zero. The nest level comparator 48-3 (FIG. 6) produces the nest level comparison signal of the binary one when the designated nest level is not greater than level two. In this event, the intra-train address varies as follows:

1, 2, 3, . . . , 15, and 16.

The intra-train address generating circuit 29 (FIG. 2) generates the intra-train address to read the required data from the memory device 24 while the intra-train address is situated between five and fourteen. Therefore, the valid signal production circuit 51 produces the valid signal of the binary one, when the intra-train address is situated between five and fourteen. Such a retrieval is for use in retrieving a broader term such as a title name of document information or a publisher name. In addition, the required data is available to hypertext search. The fourth retrieval example has an access count equal to sixteen that is about one-fourth as large as the successive access count.

Figure 15:
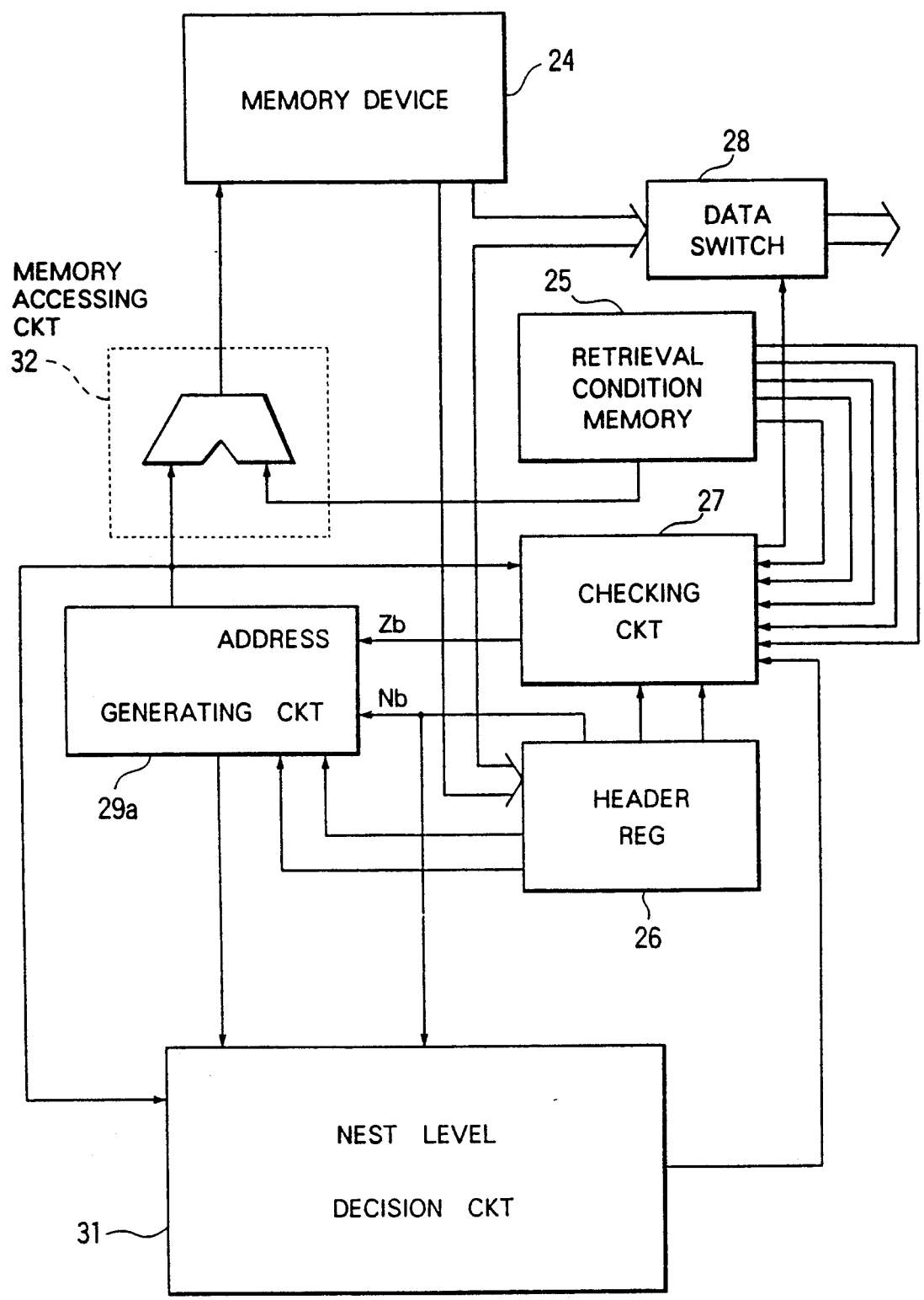
FIG. 15 is a block diagram of a token train retrieval device according to a second embodiment of the present invention.

Referring to FIG. 15, a token train retrieval device according to a second embodiment of this invention is similar to that illustrated in FIG. 2 except that the token train retrieval device comprises an address generating circuit 29a instead of a combination of the intra-train address generating circuit 29 and the end address calculating circuit 30 which are described in conjunction with FIG. 2. The address generating circuit 29a is connected to the checking circuit 27, the header register 26, the nest level decision circuit 31, and the memory accessing circuit 32. The address generating circuit 29a generates the intra-train address and the calculated address.

A combination of the retrieval condition memory 25, the header register 26, the checking circuit 27, the address generating circuit 29a, and the nest level decision circuit 31 is also called a controlled circuit. The controlled circuit is controlled by a sequence control circuit (not shown) which is similar to the sequence control circuit 70 illustrated in FIG. 2.

Figure 16:
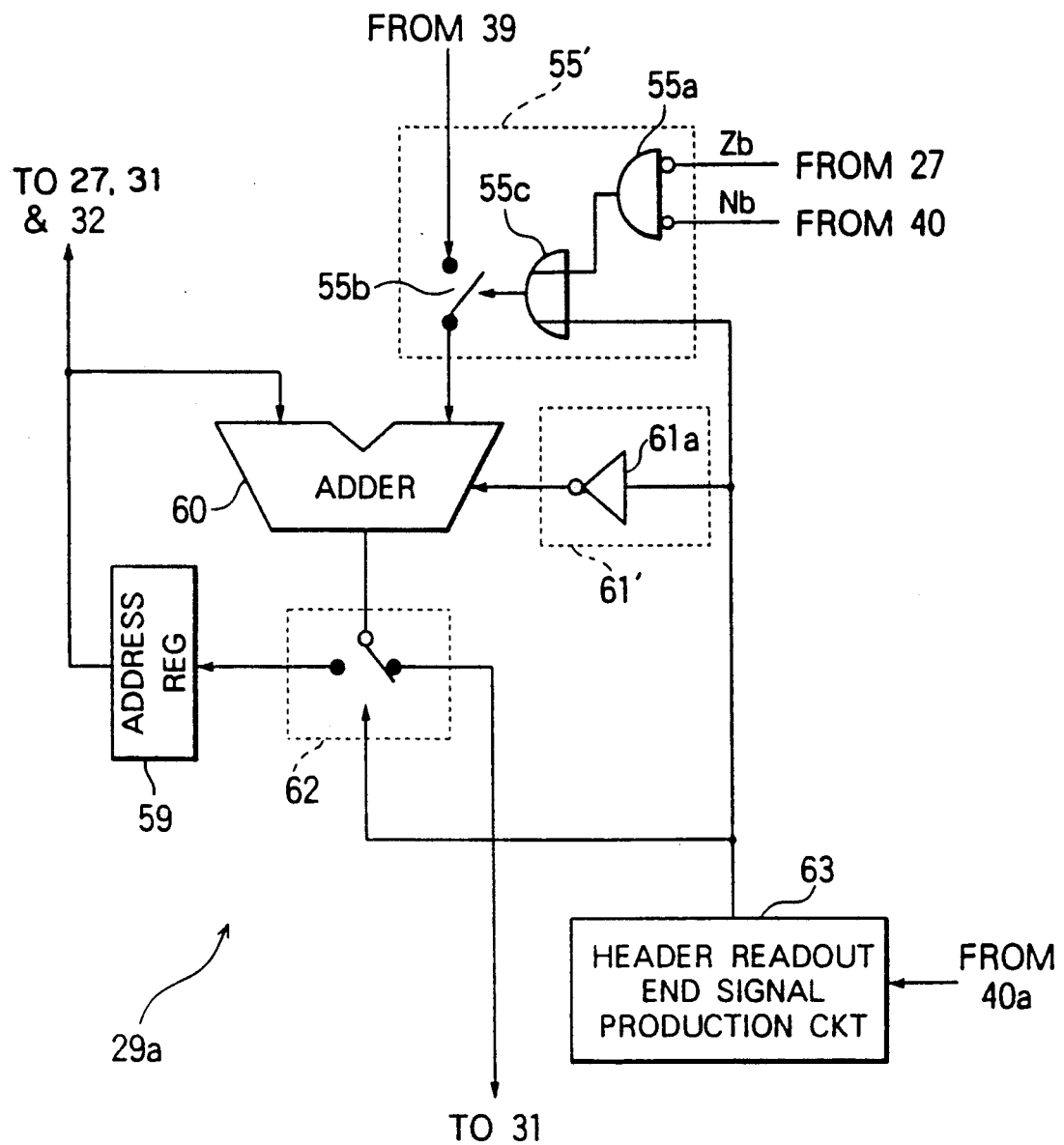
FIG. 16 is a block diagram of an address generating circuit for use in the token train retrieval device depicted in FIG. 15.

Turning to FIG. 16, the address generating circuit 29a comprises a modified supply control circuit 55', the address register 59, the adder 60, a modified carry bit generator 61', a switch 62, and a header readout end signal production circuit 63.

The header readout end signal production circuit 63 is supplied with the header detection signal from the header detector 40a (FIG. 4). Responsive to the header detection signal, the header readout end signal production circuit 63 produces a header readout end signal of the binary one. The header readout end signal is supplied to the modified supply control circuit 55', the modified carry bit generator 61', and the switch 62.

The modified supply control circuit 55' comprises an OR gate 55c in addition to the NOR gate 55a and the switch 55b. Supplied with the NOR'ed signal and the header readout end signal, the OR gate 55c produces an OR'ed signal. The OR'ed signal is supplied to the switch 55b. Responsive to the OR'ed signal of the binary one, the switch 55b turns on to supply the held data length code as the controlled code to the adder 60. Responsive to the OR'ed signal of the binary zero, the switch 55b turns off to supply the zero value code as the controlled code to the adder 60.

Supplied with the header readout end signal, the modified carry bit generator 61' generates a modified carry bit representative of the binary one when the header readout end signal represents the binary zero. Therefore, the modified carry bit generator 61' consists of an inverter gate 61a. The modified carry bit is supplied to the adder 60.

Supplied with the modified carry bit, the intra-train address of the current address, and the controlled code, the adder 60 calculates a three-term sum of the current address plus the controlled code plus the modified carry bit. The adder 60 produces a sum address representative of the three-term sum. The sum address is supplied to the switch 62.

The switch 62 is supplied with the header readout end signal. Responsive to the header readout end signal of the binary one, the switch 62 supplies the sum address as the calculated address to the nest level decision circuit 31. Responsive to the header readout end signal of the binary zero, the switch 62 supplies the sum address to the address register 59. Supplied with the sum address from the switch 63, the address register 59 holds the sum address as the intra-train address of the renewed address.

Figure 17:
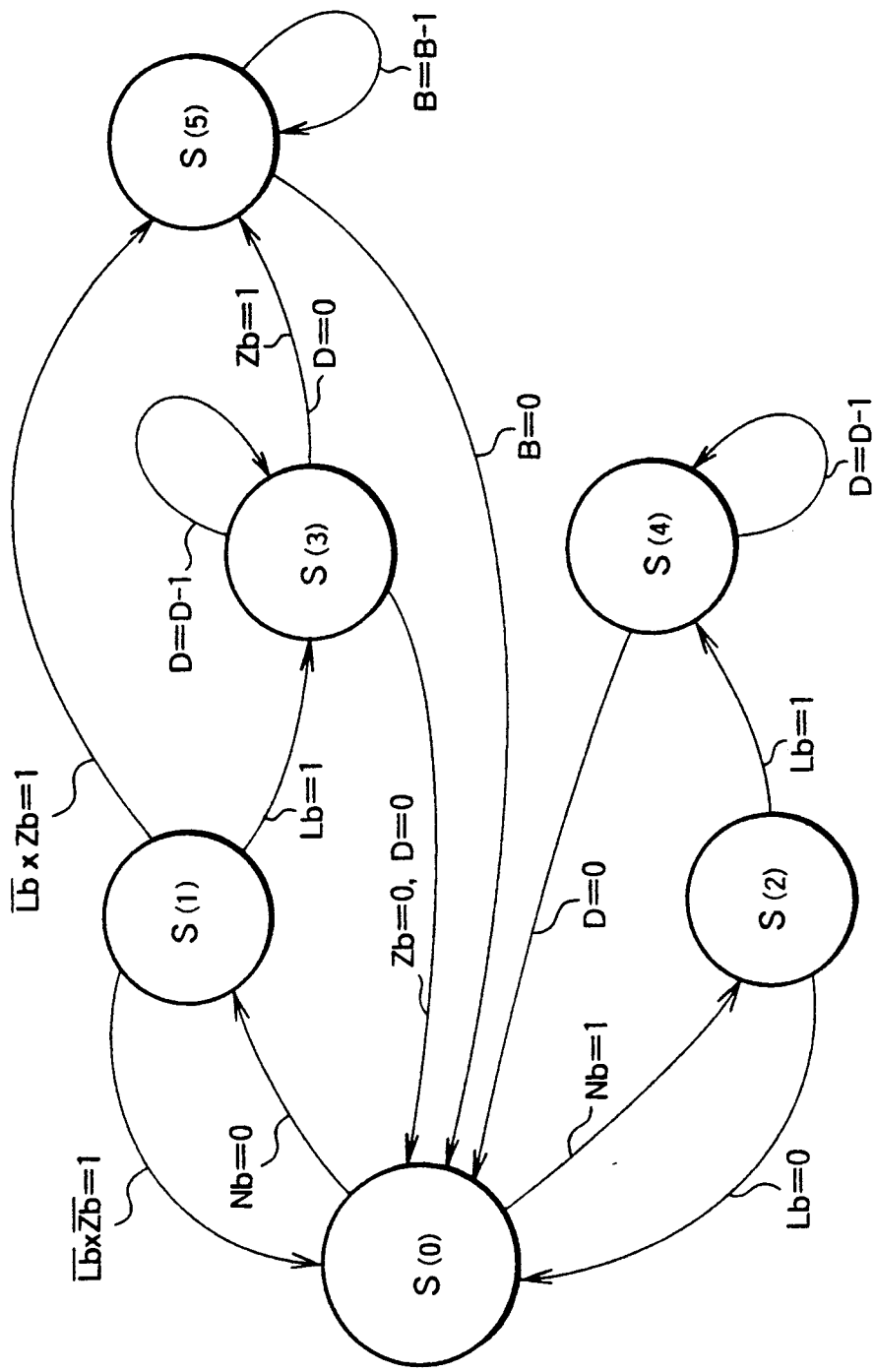
FIG. 17 shows a state transition diagram representative of state transition of retrieval operation for the token train retrieval device according to the present invention.

Referring to FIG. 17, description will be made in connection with the state transition of the retrieval operation for the token train retrieval device according to the present invention. Zeroth through fifth state nodes S(0), S(1), S(2), S(3), S(4), and S(5) are connected to one another by transition paths, each of which is depicted by a curved line with an arrow. The conditions for the state transition are labelled alongside the respective transition paths. When the condition is satisfied, the state transition of the retrieval operation occurs between the state nodes. This state transition occurs in both token train retrieval devices illustrated in FIGS. 2 and 15.

Description will be made with regard to the state transition diagram illustrated in FIG. 17. It will be assumed that an initial state of the retrieval operation is put into the zeroth state node S(0). As is known in the art, the data length code LL consists of first through eighth bits. A seventh bit of the data length code LL is a length form bit Lb indicative of whether the data length code LL is represented by a short form or a long form. When the data length code LL is represented by the short form, the length form bit Lb has the binary zero. When the data length code LL is represented by the long form, the length form bit Lb has the binary one. When the data length code LL is represented by the long form, the data length code LL is followed by a plurality of partial length codes each of which will be called an L code.

In the zeroth state node S(0), the first octet of the stored tokens or the first identifier code ID is read from the initial address of the memory device 24 (FIG. 2). When the first identifier code ID includes the nest bit Nb of the binary zero, namely, Nb=0, the state shifts from the zeroth state node S(0) to the first state node S(1). When the first identifier code ID includes the nest bit Nb of the binary one, namely, Nb=1, the state shifts from the zeroth state node S(0) to the second state node S(2).

In each of the first and the second state nodes S(1) and S(2), the second octet of the stored tokens or the first data length code LL is read from the memory device 24. After readout of the first data length code LL, the length form bit Lb of the first data length code LL and the matching signal Zb are checked. When both of the length bit form Lb and the matching signal Zb have the binary zero, namely, $\overline{Lb} \times \overline{Zb} = 1$, the state returns back to the zeroth state node S(0) from the first state node S(1). When the length form bit Lb has the binary zero, namely, Lb=0, the state returns back to the zeroth state node S(0) from the second state node S(2).

When the length form bit Lb has the binary one, namely, Lb=1, the state shifts from the first state node S(1) to the third state node S(3). The state shifts from the second state node S(2) to the fourth state node S(4) when the length form bit Lb has the binary one, namely, Lb=1. The state shifts from the first state node S(1) to the fifth state node S(5) when the length form bit Lb and the matching signal Zb have the binary zero and one, respectively, namely, $\overline{Lb} \times Zb = 1$.

It will be assumed that the first data length code LL is followed by the L codes equal in number to D, where D represents a predetermined number greater than one. The state is maintained at each of the third and the fourth state nodes S(3) and S(4) until the L codes are received (D−1) times in the manner indicated by a formula D=D−1. The state returns back to the zeroth state node S(0) from the fourth state node S(4) when the L codes are received D times in the manner indicated by another formula D=0. The state shifts from the third state nodes S(3) to the fifth state node S(5) when the L codes are received D times, namely, D=0 and furthermore when the matching signal Zb has the binary one, namely, Zb=1. The state returns back to the zeroth state node S(0) from the third state node S(3) when the L codes are received D times, namely, D=0 and furthermore when the matching signal Zb has the binary zero, namely, Zb=0.

It will be assumed that the first data length code LL is representative of the data length B. The state is maintained at the fifth state node S(5) until the data set of (B−1) octets is received in the manner indicated by a formula B=B−1. The state returns back to the zeroth state node S(0) from the fifth state node S(5) when the data set of B octets is received in the manner indicated by another formula B=0.

Figure 18:
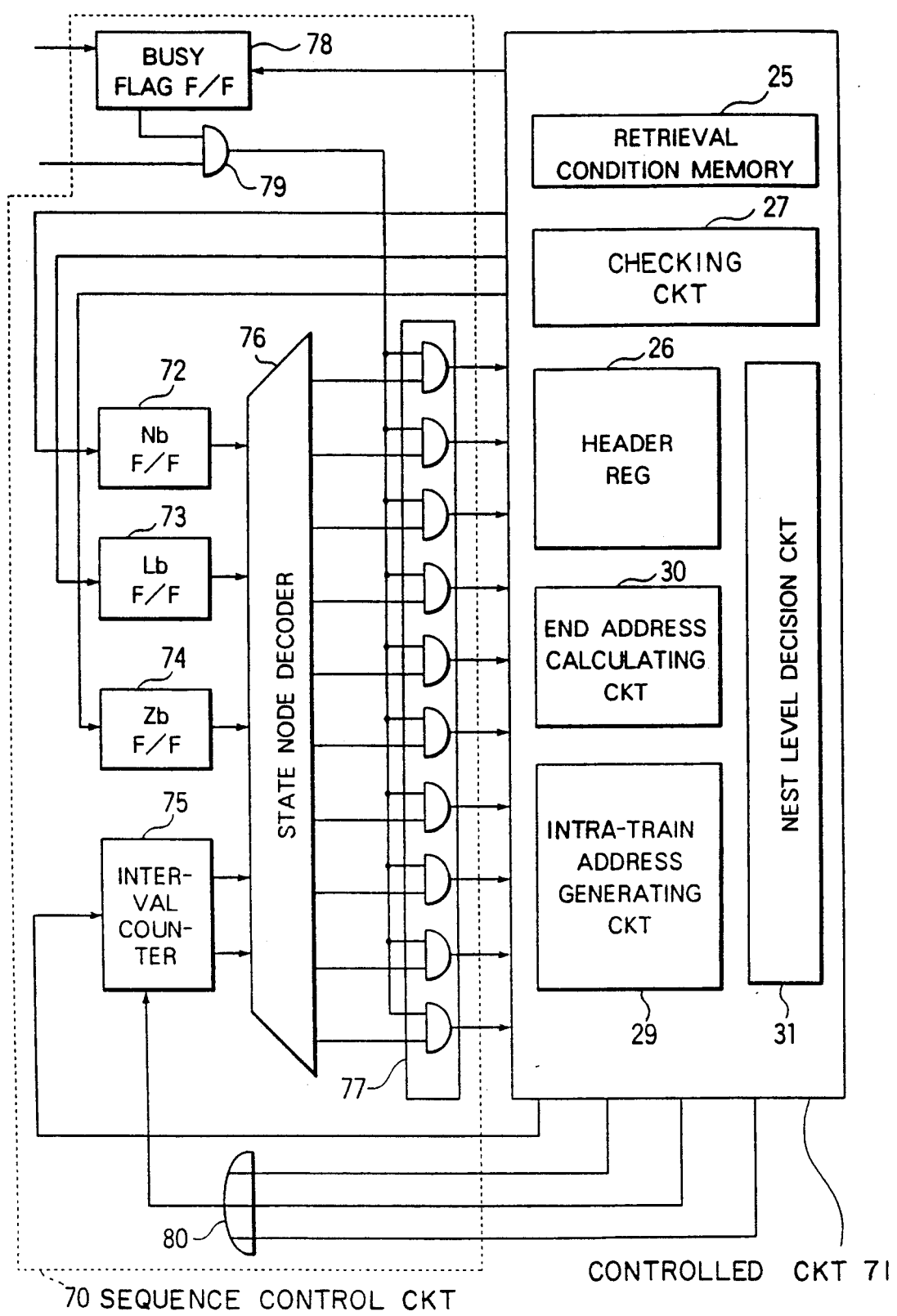
FIG. 18 shows in blocks a sequence control circuit together with a controlled circuit included in the token train retrieval device depicted in FIG. 2.

Turning to FIG. 18, a sequence control circuit 70 and the controlled circuit depicted at 71 are for use in describing the state transition in connection with the token train retrieval device illustrated with reference to FIG. 2. The controlled circuit 71 comprises the retrieval condition memory 25, the header register 26, the checking circuit 27, the intra-train address generating circuit 29, the end address calculating circuit 30, and the nest level decision circuit 31.

The sequence control circuit 70 comprises a nest bit flip-flop 72, a length form bit flip-flop 73, and a matching signal flip-flop 74. The nest bit flip-flop 72 holds the nest bit Nb supplied from the controlled circuit 71. The length form bit flip-flop 73 holds the length form bit Lb supplied from the controlled circuit 71. The matching signal flip-flop 74 holds the matching signal Zb supplied from the controlled circuit 71. An interval counter 75 is for counting an interval count indicative of an interval from the zeroth state node S(0) to each of the first through the fifth state nodes S(1) to S(5). The interval counter 75 produces an interval signal indicative of the interval count. The nest bit flip-flop 72, the length form bit flip-flop 73, the matching signal flip-flop 74, and the interval counter 75 are connected to a state node decoder 76. Supplied with the nest bit Nb, the length form bit Lb, the matching signal Zb, and the interval signal, the state node decoder 76 produces a state node signal indicative of one selected from the zeroth through the fifth state nodes S(0) to S(5). The state node signal is supplied to the controlled circuit 71 through an AND circuit 77 which comprises a plurality of AND gates.

The sequence control circuit 70 further comprises a busy flag flip-flop 78 for indicating availability of the retrieval operation. The busy flag flip-flop 78 is supplied with the start signal. The busy flag flip-flop 78 is also supplied with the end signal from the comparator 52 (FIG. 6). Responsive to the start signal, the busy flag flip-flop 78 is put into a set condition of the binary one. Responsive to the end signal, the busy flag flip-flop 78 is put into a reset condition of the binary zero. The busy flag flip-flop 78 produces a busy flag bit indicative of the availability of the retrieval operation by the binary one and zero. The busy flag bit is supplied to an AND gate 79. The AND gate 79 is supplied with the clock signal. Supplied with the clock signal and the busy flag bit, the AND gate 79 produces an AND'ed signal. The AND'ed signal is delivered to the AND circuit 77. Therefore, supply of the clock signal to the AND circuit 77 is controlled by the AND gate 79 in accordance with the busy flag bit.

The interval counter 75 is supplied with state transition signals from the controlled circuit 71 through an OR gate 80. Responsive to each of the state transition signals, the interval counter 75 counts up the interval count by one. The interval counter 75 is supplied with the end signal from the comparator 52 (FIG. 6). Responsive to the end signal, the interval counter 75 is reset.

What is claimed is:

1. A token train retrieval device including a memory device for memorizing, as stored tokens, a plurality of tokens each of which starts at a starting address and ends at an end address, each of said tokens having a nest level selected from first through N-th nest levels as a selected level, where N represents a predetermined natural number, said first through said N-th nest levels being a lowest through a highest nest level, respectively, each of said tokens comprising a header and a data set, said data set having a data length and nesting one of said tokens that has a higher nest level than said selected level, said header comprising a data length code representative of said data length and a data identifier code which includes a nest bit indicative of whether or not said one of said tokens is nested in said data set, said token train retrieval device retrieving said stored tokens to locate required data in said stored tokens that satisfy a retrieval condition and comprising:

condition memorizing means for preliminarily memorizing said retrieval condition as a stored condition;

a header register supplied as a supplied header with a header of each of selected tokens selected from said stored tokens for holding a data length code, a data identifier code, and a nest bit of said supplied header as a held data length code, a selected identifier code, and a held nest bit, respectively;

checking means connected to said condition memorizing means and to said header register and supplied with a decided nest level code for checking, in response to said held data identifier code and to said decided nest level code, whether or not said stored condition is satisfied, said checking means producing a matching signal indicative of a binary one when said stored condition is satisfied;

intra-train address generating means connected to said header register, said checking means, and said memory device for generating an intra-train address variable in response to said matching signal, said held nest, bit, and said held data length code to select said selected tokens from said stored tokens, said selected tokens including said required data;

end address calculating means connected to said intra-train address generating means and to said header register for calculating an end address of each of said selected tokens as a calculated address by using said intra-train address and said held data length code; and decision means connected to said header register, said intra-train address generating means, said end address calculating means, and said checking means for deciding a decided nest level by using said calculated address, said intra-train address, and said held nest bit, said decided nest level indicating one of said first through said N-th nest levels that is selected as said selected level, said decision means supplying a decided nest level code representative of said decided nest level to said checking means.

2. A token train retrieval device as claimed in claim 1, further comprising sequence control means connected to said condition memorizing means, said header register, said checking means, said intra-train address generating means, said end address calculating means, and said decision means and supplied with a start signal and a clock signal for controlling, in response to said start signal and said clock signal, said condition memorizing means, said header register, said checking means, said intra-train address generating means, said end address calculating means, and said decision means in accordance with a state transition of retrieval operation.

3. A token train retrieval device as claimed in claim 1, wherein said decision means comprises:

decoding means having first through (N-1)-th output lines in correspondence to said first through said (N-1)-th nest levels, respectively, and supplied with said decided nest level code for decoding said decided nest level code into a decoded signal indicative of one of said first through said (N-1)-th output lines to put said one of the first through the (N-1)-th output lines into an active state;

first through (N-1)-th end address registers connected to said end address calculating means in common and to said first through said (N-1)-th output lines, respectively, for holding, as first through (N-1)-th held addresses, said calculated address when said first through said (N-1)-th output lines are put into said active state, respectively;

first through (N-1)-th address comparing means connected to said intra-train address generating means in common and to said first through said (N-1)-th end address registers, respectively, for comparing said intra-train address with said first through said (N-1)-th held addresses to produce first through (N-1)-th reset signals when said intra-train address becomes not less than said first through said (N-1)-th held addresses, respectively;

a first flag bit flip-flop for producing a first flag bit signal representative of binary one;

second through N-th flag bit registers connected one another in cascade, to said first through said (N-1)-th address comparing means, respectively, and to said header register for producing second through N-th flag bit signals representative of binary one when said held nest bit representative of binary one is supplied to said second through said N-th flag bit registers, respectively, and furthermore when one of said first through said (N-1)-th flag bit signals of the binary one is supplied from one of said first through said (N-1)-th flag bit registers to another of said second through said N-th flag bit registers that follows in said cascade said one of the first through the (N-1)-th flag bit registers, said second through said N-th flag bit registers being reset by said first through said (N-1)-th reset signals, respectively;

encoding means connected to said first through N-th flag bit registers for encoding said zeroth through N-th flag bit signals into an encoded signal; and a nest level output register connected to said encoding means for holding said encoded signal to produce a held encoded signal as said decided nest level code.

4. A token train retrieval device as claimed in claim 1, wherein said header register comprises:

an identifier code register for holding said data identifier code of said supplied header as said held data identifier code;

a length code register for holding said data a length code of said supplied header as said held data length code; and a nest bit flip-flop for holding said nest bit of said supplied header as said held nest bit.

5. A token train retrieval device as claimed in claim 1, said memory device memorizing said stored tokens which start at an initial address, said initial address being a starting address of one of said selected tokens that should be first read from said memory device, wherein said condition memorizing means comprises an initial address register for preliminarily holding said initial address, said token train retrieval device further comprising memory accessing means connected to said memory device, said initial address register, and said intra-train address generating means for accessing said memory device by an access address representative of a sum of said initial address and said intra-train address to read said selected trains.

6. A token train retrieval device as claimed in claim 1, said intra-train address being variable to indicate a current address and later a renewed address, wherein said intra-train address generating means comprises:

a first adder supplied with said intra-train address of said current address for calculating a first sum of said current address plus a controlled code to produce a first sum address representative of said first sum;

supply control means connected to said header register, said checking means, and said first adder for controlling supply of said held data length code to said first adder to produce said controlled code, said supply control means producing said held data length code as said controlled code only when both of said held nest bit and said matching signal indicate a binary zero, said supply control means producing a zero value code representative of a value zero as said controlled code when at least one of said held nest bit and said matching signal indicates a binary one;

code holding means for holding a one value code representative of a value one;

a second adder connected to said code holding means and said first adder for calculating a second sum of said one value code plus said first sum address to produce a second sum address representative of said second sum; and an address register connected to said second adder for holding said second sum address as the intra-train address of the renewed address.

7. A token train retrieval device as claimed in claim 1, said intra-train address being variable to indicate a current address and later a renewed address, wherein said intra-train address generating means comprises:

carry bit generating means for generating a carry bit representative of a binary one;

an adder connected to said carry bit generating means and supplied with said intra-train address of said current address for calculating a sum of said current address plus a controlled code plus said carry bit to produce a sum address representative of said sum;

supply control means connected to said header register, said checking means, and said adder for controlling supply of said held data length code to said adder to produce said controlled code, said supply control means producing said held data length code as said controlled code only when both of said held nest bit and said matching signal indicate a binary zero, said supply control means producing a zero value code representative of a value zero as said controlled code when at least one of said held nest bit and said matching signal indicates a binary one; and an address register connected to said adder for holding said sum address as said intra-train address of said renewed address.

8. A token train retrieval device as claimed in claim 1, wherein said condition memorizing means comprises:

a designated identifier code register for preliminarily holding a designated identifier code;

a designated nest level register for preliminarily holding a designated nest level code indicative of a designated nest level as one of said first through said N-th nest levels; and a retrieval command register for preliminarily holding a retrieval command represented by a predetermined bit pattern which designates at least one of said designated identifier code register and said designated nest level register.

9. A token train retrieval device as claimed in claim 8, wherein said checking means comprises:

an identifier code comparator connected to said designated identifier code register and said header register for comparing said designated identifier code with said held data identifier code to produce an identifier comparison signal representing whether or not said designated identifier code matches with said held data identifier code;

a nest level comparator connected to said designated nest level register and said decision means for comparing said designated nest level code with said decided nest level code to produce a nest level comparison signal;

masking means connected to said retrieval command register, said identifier code comparator, and said nest level comparator for masking said identifier comparison signal and said nest level comparison signal by using said predetermined bit pattern representing said retrieval command to produce a masked identifier signal and a masked nest level signal; and processing means connected to said masking means for processing said masked identifier signal and said masked nest level signal to produce a processed signal as said matching signal.

10. A token train retrieval device as claimed in claim 9, wherein said nest level comparison signal represents whether or not said designated nest level matches with said decided nest level.

11. A token train retrieval device as claimed in claim 9, wherein said nest level comparison signal represents whether or not said designated nest level is greater than said decided nest level.

12. A token train retrieval device including a memory device for memorizing, as stored tokens, a plurality of tokens each of which starts at a starting address and ends at an end address, each of said tokens having a nest level selected from first through N-th nest levels as a selected level, where N represents a predetermined natural number, said first through said N-th nest levels being a lowest through a highest nest level, respectively, each of said tokens comprising a header and a data set, said data set having a data length and nesting one of said tokens that has a higher nest level than said selected level, said header comprising a data length code representative of said data length and a data identifier code which includes a nest bit indicative of whether or not said one of said tokens is nested in said data set, said token train retrieval device retrieving said stored tokens to locate required data in said stored tokens that satisfy a retrieval condition and comprising:

condition memorizing means for preliminarily memorizing said retrieval condition as a stored condition;

a header register supplied as a supplied header with a header of each of selected tokens selected from said stored tokens for holding a data length code, a data identifier code, and a nest bit of said supplied header as a held data length code, a held data identifier code, and a held nest bit, respectively;

checking means connected to said condition memorizing means and to said header register and supplied with a decided nest level code for checking, in response to said held data identifier code and to said decided nest level code, whether or not said stored condition is satisfied, said checking means producing a matching signal indicative of a binary one when said stored condition is satisfied;

address generating means connected to said header register, said checking means, and said memory device for generating an intra-train address and a calculated address, said intra-train address being variable in response to said matching signal, said held nest bit, and said held data length code to select said selected tokens from said stored tokens, said selected tokens including said required data, said calculated address being an end address of each of said selected tokens and being calculated by using said intra-train address and said held data length code; and decision means connected to said header register, said address generating means, and said checking means for deciding a decided nest level by using said calculated address, said intra-train address, and said held nest bit, said decided nest level indicating one of said first through said N-th nest levels that is selected as said selected level, said decision means supplying a decided nest level code representative of said decided nest level to said checking means.

13. A token train retrieval device as claimed in claim 12, further comprising sequence control means connected to said condition memorizing means, said header register, said checking means, said address generating means, and said decision means and supplied with a start signal and a clock signal for controlling, in response to said start signal and said clock signal, said condition memorizing means, said header register, said checking means, said address generating means, and said decision means in accordance with a state transition of retrieval operation.

14. A token train retrieval device as claimed in claim 12, wherein said decision means comprises:

decoding means having first through (N-1)-th output lines in correspondence to said first through said (N-1)-th nest levels, respectively, and supplied with said decided nest level code for decoding said decided nest level code into a decoded signal indicative of one of said first through said (N-1)-th output lines to put said one of said first through the (N-1)-th output lines into an active state;

first through (N-1)-th end address registers connected to said address generating means in common and to said first through said (N-1)-th output lines, respectively, for holding, as first through (N-1)-th held addresses, said calculated address when said first through said (N-1)-th output lines are put into said active state, respectively;

first through (N-1)-th address comparing means connected to said address generating means in common and to said first through said (N-1)-th end address registers, respectively, for comparing said intra-train address with said first through said (N-1)-th held addresses to produce first through (N-1)-th reset signals when said intra-train address becomes not less than said first through said (N-1)-th held addresses, respectively;

a first flag bit register for producing a first flag bit signal representative of binary one;

second through N-th flag bit registers connected one another in cascade, to said first through said (N-1)-th address comparing means, respectively, and to said header register for producing second through N-th flag bit signals representative of binary one when said held nest bit representative of binary one is supplied to said second through said N-th flag bit registers, respectively, and furthermore when one of said first through said (N-1)-th flag bit signals of binary one is supplied from one of said first through said (N-1)-th flag bit registers to another of said second through said N-th flag bit registers that follows in said cascade said one said first through the (N-1)-th flag bit registers, said second through said N-th flag bit registers being reset by said first through said (N-1)-th reset signals, respectively;

encoding means connected to said first through N-th flag bit registers for encoding said zeroth through N-th flag bit signals into an encoded signal; and a nest level output register connected to said encoding means for holding said encoded signal to produce a held encoded signal as said decided nest level code.

15. A token train retrieval device as claimed in claim 12, wherein said header register comprises:

an identifier code register for holding said data identifier code of said supplied header as said held data identifier code;

a length code register for holding said data length code of said supplied header as said held data length code; and a nest bit flip-flop for holding said nest bit of said supplied header as said held nest bit.

16. A token train retrieval device as claimed in claim 12, said memory device memorizing said stored tokens which start at an initial address, said initial address being a starting address of one of said selected tokens that should be first read from said memory device, wherein said condition memorizing means comprises an initial address register for preliminarily holding said initial address, said token train retrieval device further comprising memory accessing means connected to said memory device, said initial address register, and said address generating means for accessing said memory device by an access address representative of a sum of said initial address and said intra-train address to read said selected trains.

17. A token train retrieval device as claimed in claim 12, said intra-train address being variable to indicate a current and later a renewed address, wherein said address generating means comprises:

signal production means for producing a header readout end signal of a binary one when readout of said header ends;

carry bit generating means connected to said signal production means for generating a carry bit representative of a binary one in response to the said header readout end signal;

an adder connected to said carry bit generating means and supplied with said intra-train address of said current address for calculating a three-term sum of said current address plus a controlled code plus said carry bit to produce a sum address representative of said three-term sum;

supply control means connected to said signal production means, said header register, said checking means, and said adder for controlling supply of said held data length code to said adder to produce said controlled code, said supply control means producing said held data length code as said controlled code either when both of said held nest bit and said matching signal indicates a binary zero or when said header readout end signal indicates a binary one, said supply control means producing a zero value code representative of a value zero as said controlled code either when at least one of said held nest bit and said matching signal indicates a binary one or when said header readout end signal indicates a binary zero;

switching means connected to said signal production means and said adder for producing said sum address as said calculated address in response to said header readout end signal of a binary one and for producing said sum address as the intra-train address of said renewed address in response to said header readout end signal of binary zero; and an address register connected to said switching means for holding said renewed address.

18. A token train retrieval device as claimed in claim 12, wherein said condition memorizing means comprises:

a designated identifier code register for preliminarily holding a designated identifier code;

designated nest level register for preliminarily holding a designated nest level code indicative of a designated nest level as one of said first through said N-th nest levels; and a retrieval command register for preliminarily holding a retrieval command represented by a predetermined bit pattern which designates at least one of said designated identifier code register and said designated nest level register.

19. A token train retrieval device as claimed in claim 18, wherein said checking means comprises:

an identifier code comparator connected to said designated identifier code register and said header register for comparing said designated identifier code with said held data identifier code to produce an identifier comparison signal representing whether or not said designated identifier code matches with said held data identifier code;

a nest level comparator connected to said designated nest level register and said decision means for comparing said designated nest level code with said decided nest level code to produce a nest level comparison signal;

masking means connected to said retrieval command register, said identifier code comparator, and said nest level comparator for masking said identifier comparison signal and said nest level comparison signal by using the predetermined bit pattern representing said retrieval command to produce a masked identifier signal and a masked nest level signal; and processing means connected to said masking means for processing said masked identifier signal and said masked nest level signal to produce a processed signal as said matching signal.

20. A token train retrieval device as claimed in claim 19, wherein said nest level comparison signal represents whether or not said designated nest level matches with said decided nest level.

21. A token train retrieval device as claimed in claim 19, wherein said nest level comparison signal represents whether or not said designated nest level is greater than said decided nest level.

* * * * *